US008116530B2

(12) United States Patent
Miyazaki

(10) Patent No.: US 8,116,530 B2
(45) Date of Patent: Feb. 14, 2012

(54) MAP CHANGE DETECTION DEVICE, MAP CHANGE DETECTION METHOD, AND PROGRAM

(75) Inventor: Tohru Miyazaki, Osaka (JP)

(73) Assignee: NEC System Technologies, Ltd., Osaka (JP)

( * ) Notice: Subject to any disclaimer, the term of this patent is extended or adjusted under 35 U.S.C. 154(b) by 920 days.

(21) Appl. No.: 12/125,649

(22) Filed: May 22, 2008

(65) Prior Publication Data

US 2008/0298638 A1    Dec. 4, 2008

(30) Foreign Application Priority Data

May 31, 2007    (JP) ................... 2007-145971

(51) Int. Cl.
*G06K 9/00*    (2006.01)
(52) U.S. Cl. .............. 382/106; 382/154; 345/419
(58) Field of Classification Search ........... 382/106, 382/154; 345/419
See application file for complete search history.

(56) References Cited

U.S. PATENT DOCUMENTS

| | | | | |
|---|---|---|---|---|
| 6,963,662 | B1 * | 11/2005 | LeClerc et al. | 382/154 |
| 7,149,346 | B2 * | 12/2006 | Oniyama | 382/154 |
| 2002/0061132 | A1 * | 5/2002 | Furukawa | 382/154 |
| 2004/0236535 | A1 * | 11/2004 | Hyyppa et al. | 702/155 |
| 2007/0025595 | A1 * | 2/2007 | Koizumi et al. | 382/103 |

FOREIGN PATENT DOCUMENTS

| | | |
|---|---|---|
| JP | 03167678 A | 7/1991 |
| JP | 08016930 A | 1/1996 |
| JP | 2002063580 A | 2/2002 |
| JP | 2002157576 A | 5/2002 |
| JP | 2002206925 A | 7/2002 |
| JP | 2002366977 A | 12/2002 |
| JP | 2004117245 A | 4/2004 |
| JP | 2004198530 A | 7/2004 |
| JP | 2005234603 A | 9/2005 |
| JP | 2007003244 A | 1/2007 |
| JP | 2007034808 A | 2/2007 |
| JP | 2008530594 A | 8/2008 |

OTHER PUBLICATIONS

Japanese Office Action for JP2007-145971 issued Apr. 21, 2009.

* cited by examiner

*Primary Examiner* — Wesley Tucker

(57) ABSTRACT

Changes in houses and buildings on a two-dimensional map are detected using three-dimensional data obtained from stereo images. A change detection device that detects changes in features that are targets described on a map has a stereo processor, a feature height calculator, and a demolition and/or new building detector. The stereo processor is inputted with a plurality of images taken of predetermined regions from a plurality of different positions, and extracts digital surface model data representing surfaces of the regions in three-dimensional coordinates. The feature height calculator extracts feature heights where an elevation of ground level is subtracted from the digital surface model data extracted by the stereo processor. The demolition and/or new building detector detect changes in the feature that are the targets described on a map by comparing feature height data and map data. An elevation region extractor extracts an elevation region that is a set of points having a height greater than or equal to the predetermined value, compares the elevation region and the map data, and detects changes in the feature constituting the targets.

13 Claims, 19 Drawing Sheets

```
01: NO CHANGE      N35.2349   E130.0124
02: DEMOLISHED     N35.2355   E130.0138
03: NO CHANGE      N35.2349   E130.0151
04: NO CHANGE      N35.2349   E130.0162
05: NO CHANGE      N35.2349   E130.0173
06: NO CHANGE      N35.2370   E130.0151
07: NO CHANGE      N35.2382   E130.0124
08: DEMOLISHED     N35.2382   E130.0132
09: NO CHANGE      N35.2382   E130.0144
10: NO CHANGE      N35.2382   E130.0154
11: NO CHANGE      N35.2382   E130.0165
12: NEW BUILDING   N35.2370   E130.0162
```

MAP CHANGE DETECTION DEVICE, MAP CHANGE DETECTION METHOD, AND PROGRAM

This application is based upon and claims the benefit of priority from Japanese patent application No. 2007-145971, filed May 31, 2007, the disclosure of which is incorporated herein in its entirety by reference.

BACKGROUND OF THE INVENTION

1. Field of the Invention

The present invention relates to a map change detection device that detects changes such as changes in houses and buildings on a map. The present invention more specifically relates to a map change detection device, a map change detection method, and a map change detection program that detect changes in houses and buildings etc. on a two-dimensional map using digital surface layer model data obtained from a stereo image.

2. Description of the Related Art

As a method of detecting changes in maps, a method of detecting changes in housing exists where a map is projected onto aerial photographs. Changes in housing are then detected by comparing the buildings on the map and the buildings on the aerial photographs one at a time by visual observation. This approach is, however, extremely expensive because it is necessary to investigate all changes in buildings on the map by visual observation. Detection can be missed because the operation is a manual operation.

Changes in the maps are indicative of changes caused by buildings being knocked down or by new buildings being erected. A building being knocked down refers to a building being removed and becoming a vacant land lot. A building being erected refers to a building being newly added to a vacant land lot.

As a result of this situation, a method of detecting changes in maps using aerial photographs and satellite images etc. was proposed, as disclosed in, for example, Unexamined Japanese Patent Application KOKAI Publication No. 2002-63580 (patent document 1). In Unexamined Japanese Patent Application KOKAI Publication No. 2002-63580, an image matching method is disclosed where two types or more of images taken of the same region using aerial photographs or satellite images are utilized. Images are then automatically searched from images of buildings matching with indefinite forms made from house shapes on the map. When an indefinite form no longer exists, it can be known that the building is no longer there.

In addition, technology that determines changes in buildings from old and new image data or laser data is disclosed in Unexamined Japanese Patent Application KOKAI Publication No. 2004-117245, Unexamined Japanese Patent Application KOKAI Publication No. 2007-3244, and Unexamined Japanese Patent Application KOKAI Publication No. 2007-34808. Moreover, technology is disclosed in Unexamined Japanese Patent Application KOKAI Publication No. 2004-198530 and Unexamined Japanese Patent Application KOKAI Publication No. 2005-234603 where maps and image data are collated and changes are determined by detecting new features.

A method is also disclosed in Unexamined Japanese Patent Application KOKAI Publication No. Hei. 03-167678 where three-dimensional numeric data is obtained from stereo images.

SUMMARY OF THE INVENTION

The following problems were, however, encountered with the related technology explained above.

There are also cases where detection of changes in the map are missed in technology relating to the example given in Unexamined Japanese Patent Application KOKAI Publication No. 2002-63580. The reason for this is that demolition of buildings is determined from the results of image matching. This means that when a large number of similar shaped houses exist, failures occur in the image matching and there are therefore cases where originally demolished houses are not detected.

The problem also exists that new buildings such as when a building that is not on the map is newly built will not be detected because it has been assumed that a building already exists on the map. It is therefore necessary to check for buildings that are new buildings by visual observation while updating the map. This checking is prohibitively expensive and is a manual operation which means that detection omissions may occur.

It is therefore an object of the present invention to provide a map change detection device, a map change detection method, and a map change detection program capable of automatically detecting changes in buildings on a map and only detect locations of buildings that have changed. In this way, it is possible to keep down costs involved in detecting changes, and detection with few omissions is possible.

In order to achieve the above embodiment, a map change detection device of a first aspect of the present invention is a map change detection device that detects change in features that are targets described on a map, comprising a stereo matching processor that is inputted with a plurality of images taken of predetermined regions from a plurality of different positions, extracts digital surface model data representing surfaces of the predetermined regions in three-dimensional coordinates, a feature height extractor that extracts feature heights where an elevation from ground level is subtracted, from the digital surface model data extracted by the stereo matching processor and a change detector that detects change in a feature that is the target by comparing feature height data extracted by the feature height extractor and map data.

A method for detecting change in a map of a second aspect of the present invention is a map change detection method that detects changes in features that are targets included in a predetermined region on a map, comprising stereo matching processing where a plurality of images taken of predetermined regions from a plurality of different positions are inputted and digital surface model data representing surfaces of the predetermined regions in three-dimensional coordinates is extracted, feature height extraction where feature heights where an elevation from ground level is subtracted, are extracted from the digital surface model data extracted by the stereo matching processing and change detection that detects change in a feature that is the target by comparing feature height data extracted by the feature height extraction and map data.

A computer-readable storage medium of a third aspect of the present invention implements, on a computer, a stereo matching processor inputted with a plurality of images taken of predetermined regions from a plurality of different positions, that extracts digital surface model data representing surfaces of the predetermined regions in three-dimensional coordinates, a feature height extractor that extracts feature heights where an elevation from ground level is subtracted, from the digital surface model data extracted by the stereo matching processor, and a change detector that detects change in a feature that is the target described on a map by comparing feature height data extracted by the feature height extractor and map data.

"Features" is a generic name for features such as buildings and trees at ground level. Digital Surface Model Data (hereinafter referred to as "DSM data") represents undulations on the ground using a three-dimensional coordinate system. The stereo matching processing is processing that obtains points corresponding to within each image taken for the same point for a number of images taken from different viewpoints. The stereo matching processing then obtains depth and shapes to targets using triangulation theory employing the parallaxes.

BRIEF DESCRIPTION OF THE DRAWINGS

These objects and other objects and advantages of the present invention will become more apparent upon reading of the following detailed description and the accompanying drawings.

FIG. 16 is a schematic view showing an example of DSM data of an applied example;

FIG. 17 is a schematic view showing an example of mesh data of an applied example;

FIG. 18 is a schematic view showing an example of feature height data of an applied example;

FIG. 19 is a schematic view showing an example of extracted feature height data of an applied example;

FIG. 20 is a schematic view showing an example of demolition detection results of an applied example;

FIG. 21 is a schematic view showing an example of new building detection results of an applied example;

DETAILED DESCRIPTION

The following is a detailed description with reference to the drawings of a preferred embodiment of the invention. Portions within the drawings that are the same or corresponding are given the same numerals and description thereof is not repeated. In this embodiment, changes in targets contained in a predetermined region on a map are detected from a number of items of image data taken for the same region from above.

Figure 1:
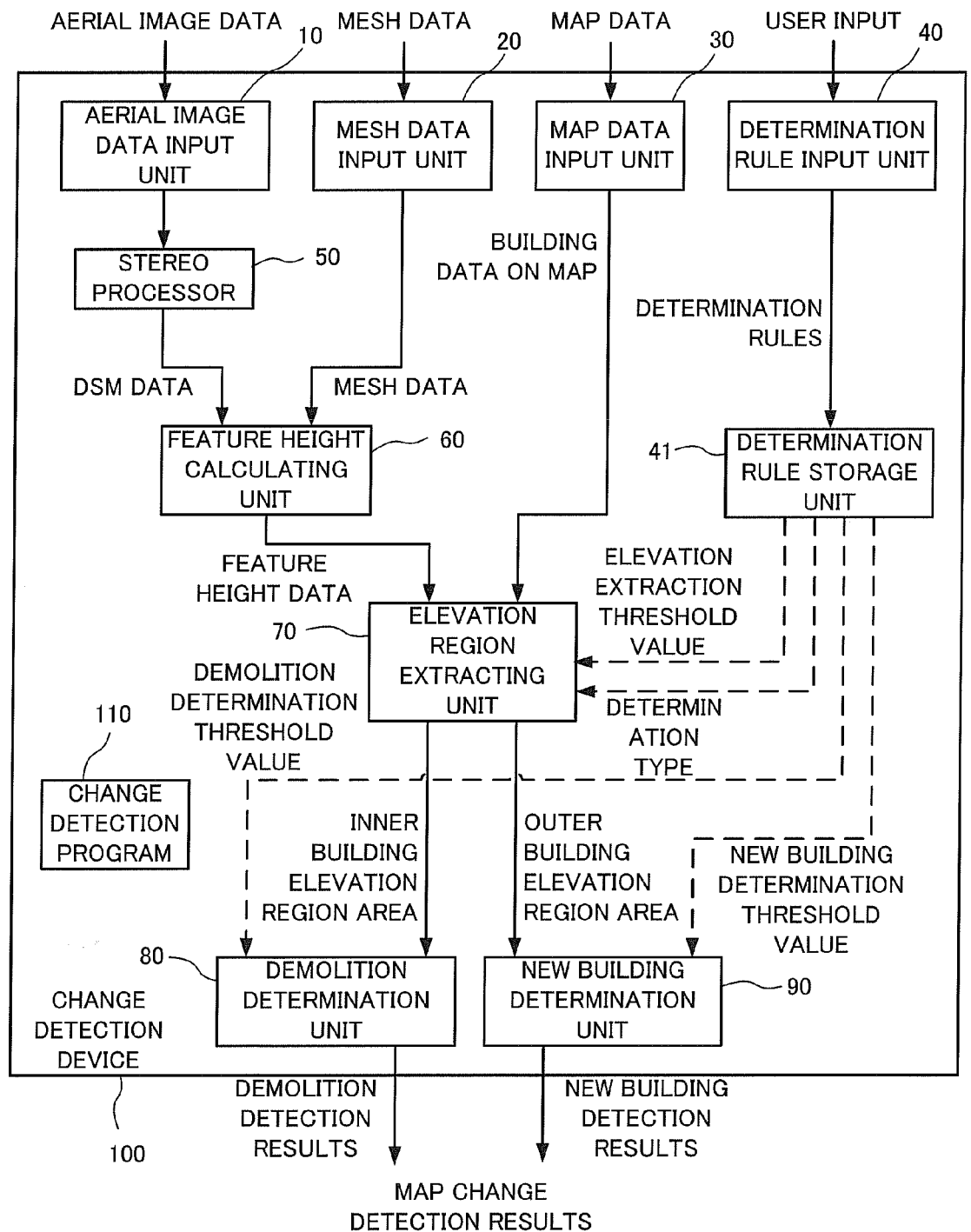
FIG. 1 is a block diagram showing an example of a change detection device of an embodiment of the present invention.

Detection of changes in buildings on the map is explained in this embodiment. FIG. 1 is a block diagram showing an example configuration for a change detection device 100 of the embodiment of the present invention;

The change detection device 100 has an aerial image data input unit 10, a mesh data input unit 20, a map data input unit 30, a determination rule input unit 40, a determination rule storage unit 41, a stereo processing unit 50, a feature height calculating unit 60, a elevation region extracting unit 70, a demolition determination unit 80, a new building determination unit 90, and a change detection program 110.

The aerial image data input unit 10 has a function for inputting image data and inputs a number of items of aerial image data used in stereo matching processing. Aerial images are images of aerial photographs that have been converted to digital images.

Figure 9:
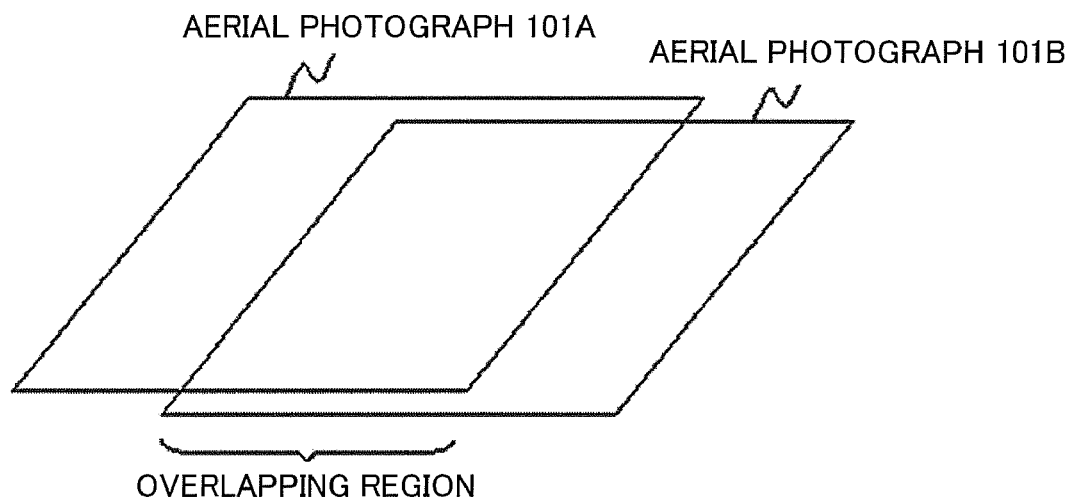
FIG. 9 is a schematic view showing an example of an aerial photograph used in input.

FIG. 9 schematically depicts an example of an aerial photograph converted to aerial image data. The aerial photograph shown in FIG. 9 is constituted by an aerial photograph 101A and an aerial photograph 101B taken consecutively from above from an airplane. The aerial photograph 101A and the aerial photograph 101B are taken to as to overlap by 60 percent in the direction of travel of the airplane.

The aerial image of this embodiment is an image generated by digitally converting aerial photographs taking the aerial photograph 101A and the aerial photograph 101B as examples. The image used in the present invention is by no means limited to being an aerial image, and can also be an image for a satellite photograph put into digital form, a digital image taken using a typical digital camera, or a digital image where an analog photograph taken using a typical analog camera is scanned so as to be put into digital form to give a digital image.

The mesh data input unit 20 has a function for inputting mesh data recorded for an elevation of ground level of a predetermined region and inputs mesh data for a region change detection is carried out for. Mesh data is data indicating an elevation value for respective grid sections when ground level is divided up into a lattice.

As explained in the following, at the feature height calculating unit 60, feature height data is extracted from a difference between DSM data and mesh data. It is therefore preferable for the mesh data to include the same lattice shape as the DSM data.

The map data input unit 30 has a function that inputs map data and inputs map data for a region where change detection is carried out. The map data is data that holds information such as the position, shape, and size etc. of houses, roads, trees, and other items on the map.

Figure 10:
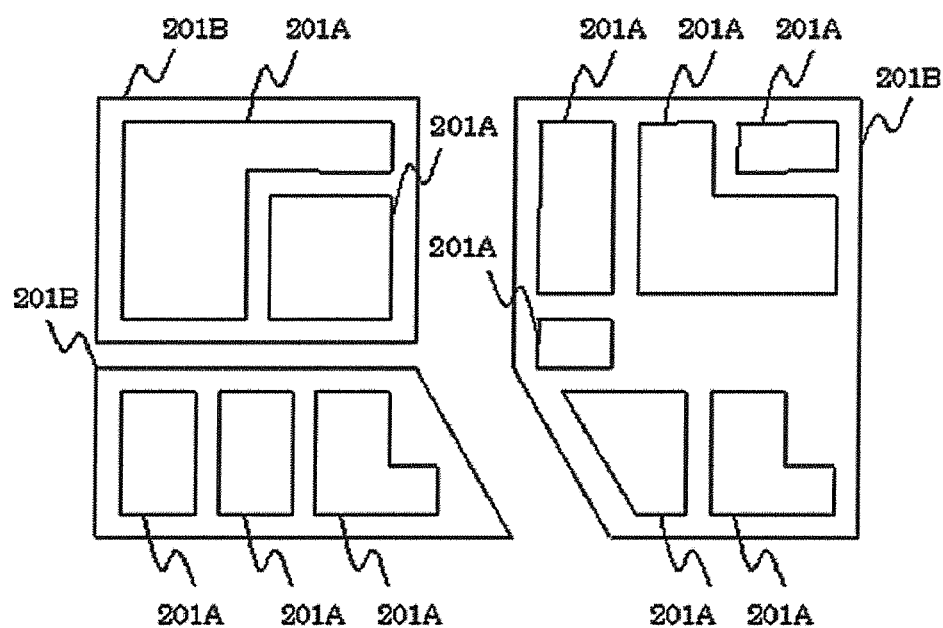
FIG. 10 is a schematic view showing an example of map data used in input.

FIG. 10 is a diagram showing an example of map data. The map data shown in FIG. 10 is composed of buildings 201A and blocks 201B. Longitude and latitude information is assigned to both vertex coordinates of both the buildings 201A and the blocks 201B. Vector information that is information for connecting vertexes of both the buildings 201A and the blocks 201B is included at the buildings 201A and the blocks 201B but information relating to segments between the vertexes is not included.

The digital data for a map shown, for example, in FIG. 10 is used in this embodiment. FIG. 10 is an example of map data used in the present invention. The map data used in the present invention can be a raster information map having longitude and latitude information for each coordinate of contours of a building or a street or can be a map including trees, contour lines, or cables, etc. It is also possible for information for an address, the age of a building, and the surface area etc. to be assigned to the buildings 201A and the blocks 201B individually.

The determination rule input unit 40 has a function for inputting determination rules and inputs threshold values for carrying out change detection. Determination rules inputted by the determination rule input unit 40 are saved in the determination rule storage unit 41. The determination rules are then acquired at the appropriate time by the determination rule storage unit 41 while carrying out change detection.

The determination rules inputted to the determination rule input unit 40 include a height extraction threshold value for during the acquisition of height regions that are sets of ground points having a height of a predetermined value or more, a demolition determination threshold value for when determining determination type and determining demolitions, and a new building determination threshold value for the case of determining new buildings.

The stereo processing unit 50 performs stereo matching processing on a number of items of aerial image data and generates DSM data using triangulation theory. For example, a predetermined position shift (parallax) occurs for a corresponding feature position between a set of an aerial photograph 101A and an aerial photograph 101B. The stereo matching processing then obtains height data having a coordinate value containing the height of the surface of the feature by calculating this position shift.

The extent of the position shift is measured from a position where a correlation function is a maximum when image correlation of corresponding small regions in the vicinity is taken for within the normal two images. DSM data is then generated by measuring height in-plane every fixed interval of the lattice by carrying out image correlation processing over the whole of the captured image. The DSM data includes height data having the elevation values obtained in the stereo matching processing. The DSM data therefore includes, for example, height data for the uppermost surface of a building.

Various methods exist for the method for carrying out stereo matching processing such as obtaining and correlating typical characteristic quantities and obtaining correlation between left and right images and this method is not limited to the method used in the stereo matching processing of this embodiment. For example, it is also possible to use the stereo matching processing disclosed in Japanese Patent Publication No. Hei. 8-16930.

The feature height calculating unit 60 has a function for calculating height of a feature and calculates feature height data from a difference between the DSM data and the mesh data. The feature height data is obtained from a differential of the DSM data and the mesh data and is data including the height of just the feature. There are also cases where the height of the feature is inclined when the feature is erected on an inclined surface.

The elevation region extracting unit 70 has a function for extracting an elevation region that is a set of ground points having heights of a predetermined value or more from the feature height data. The elevation region extracting unit 70 then generates an elevation region and extracted feature height data other than this using an elevation extraction threshold value inputted by the determination rule storage unit 41 and map data inputted by the map data input unit 30. Extracted feature height data is feature height data where the height of locations lower than a threshold value specified by a user is zero. Elevation regions refers to regions for locations, of the extracted feature height data, where the height is greater than 0.

Further, the elevation region extracting unit 70 extracts the area of inner building elevation regions and the area of outer building elevation regions on a map based on the determination type acquired from the determination rule storage unit 41. Inner building elevation regions is elevated regions that exists only within the confinds of buildings on a map. Outer building elevation regions is elevated regions that only exist outside of the confinds of buildings on a map.

The demolition determination unit 80 has a function for determining whether or not a building on the map has been demolished. This function determines whether or not demolition has occurred by determining whether or not the area of inner building elevation regions exceeds the area inputted by the determination rule storage unit 41.

The new building determination unit 90 has a function for determining whether or not outer building elevation regions is new regions within new buildings. The new building determination unit 90 determines the presence or absence of new buildings by determining whether or not the area of outer building elevation regions exceeds the area inputted by the determination rule storage unit 41.

A change detection program 110 can implement each of the functions of each structural element of the change detection device 100 as hardware mounted on circuit parts or as software implemented on a computer processing device.

Figure 2:
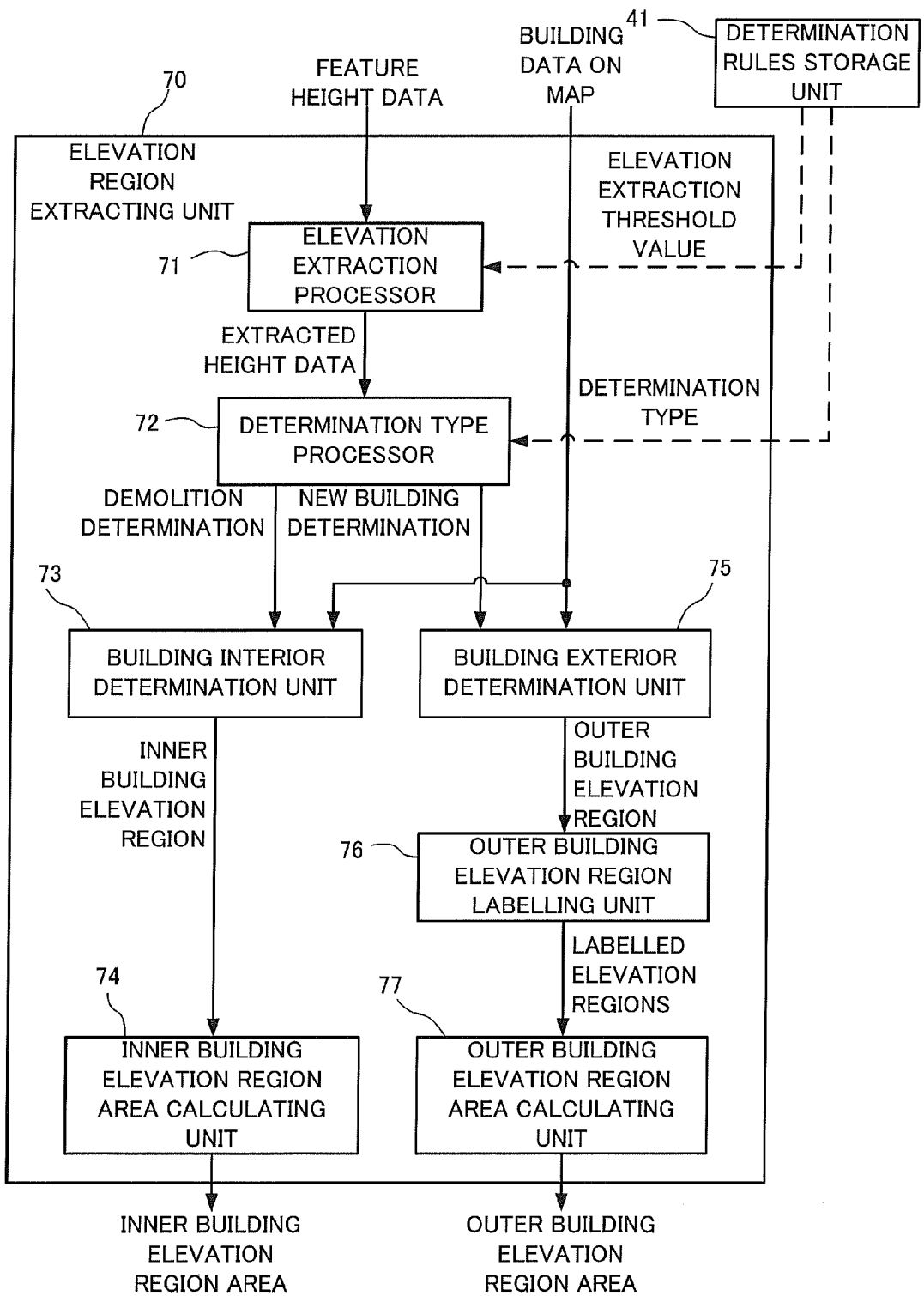
FIG. 2 is a block diagram showing an example of an elevation region extractor of the change detection device of the embodiment of the present invention.

FIG. 2 is a block diagram showing an example configuration for the elevation region extraction unit 70 of the embodiment of the present invention. The elevation region extracting unit 70 has an elevation extraction processor 71, a determination type processor 72, a building interior determination unit 73, an inner building elevation region area calculating unit 74, a building exterior determination unit 75, an outer building elevation region labeling unit 76, and an outer building elevation region area calculating unit 77.

The elevation extraction processor 71 has a function for extracting elevation regions exceeding the threshold value from the feature height data. The elevation extraction processor 71 extracts feature height data higher than the acquired extraction threshold value from the determination rule storage unit 41.

The determination type processor 72 has a function for separating process flow according to determination type. The determination type processor 72 separates the flow of processes using the extracted feature height data into processes for demolition determination and processes for new building determination using the determination type acquired from the determination rule storage unit 41.

The building interior determination unit 73 has a function for extracting just inner building elevation regions from extracted feature height data. The building interior determination unit 73 determines whether or not feature height data is for inner building regions in pixel units and extracts inner building elevation regions from feature height data for inner building regions. Here, "pixel" refers to a minimum unit for regions such as color information possessed by image data, DSM data, mesh data, and feature height data, and latitude and longitude and height information.

The inner building elevation region area calculating unit 74 has a function for calculating the area of inner building elevation regions. The inner building elevation region area calculating unit 74 calculates the area of inner building elevation regions for each respective building for inner building elevation regions existing for each building on a map.

The building exterior determination unit 75 has a function for extracting only outer building elevation regions from extracted feature height data. The building exterior determination unit 75 determines whether or not feature height data is for outer building regions in pixel units and extracts outer building elevation regions from feature height data for outer building regions.

The outer building elevation region labeling unit 76 has a function for subjecting outer building elevation regions to labeling processing and applies labels to elevation regions that are outside of buildings. Labeling processing is processing that confers the same label between two pixels when the neighboring two pixels are for outer building elevation regions and is processing where neighboring extraction pixels are extracted as a collective region.

The outer building elevation region area calculating unit 77 has a function for calculating surface area of outer building elevation regions and calculates the surface area of elevation regions each respective label for outer building elevation regions that are assigned labels.

Figure 3:
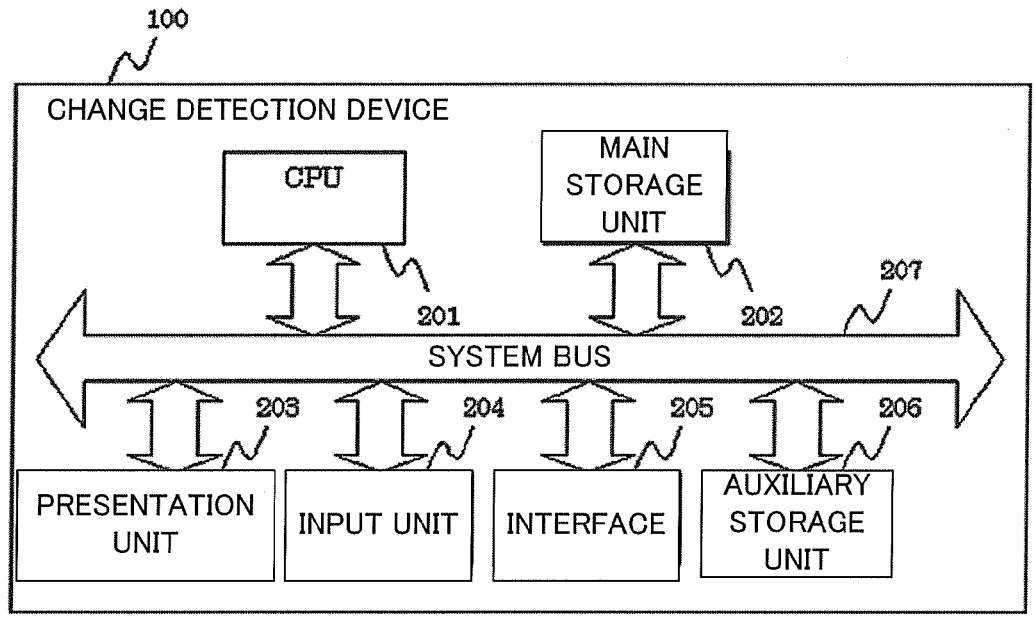
FIG. 3 is a block diagram showing an example of a physical structure for a change detection device of the embodiment of the present invention.

FIG. 3 is a block diagram showing an example of a physical structure for a change detection device 100 of the embodiment. The change detection device 100 of the present invention can be implemented using the same hardware structure as for a typical computer device and includes a CPU (Central Processing Unit) 201, a main storage unit 202, a presentation unit 203, an input unit 204, an interface 205, an auxiliary storage unit 206, and a system bus 207. The main storage unit 202, the presentation unit 203, the input unit 204, the interface 205, and the auxiliary storage unit 206 are each connected to the CPU 201 via the system bus 207.

The CPU 201 executes change detection processing in accordance with programs stored in the auxiliary storage unit 206.

The main storage unit 202 is a main memory such as RAM (Random Access Memory) and is used as a work region and temporary storage region for data. The presentation unit 203 includes a display, printer, and speaker etc. and presents the results of processing of the change detection device 100. The input unit 204 consists of a keyboard and mouse etc. and is inputted with operator instructions. The interface 205 is connected with peripheral equipment and transmits and receives data.

The auxiliary storage unit 206 is constructed from non-volatile memory such as a ROM (Read Only Memory), a magnetic disc, and semiconductor memory. The auxiliary storage unit 206 stores a program for executing the processes on the CPU 201 in advance. The auxiliary storage unit 206 also supplies data stored by the program to the CPU 201 in accordance with instructions from the CPU 201 and stores data supplied by the CPU 201.

The change detection device 100 of the present invention can be configured from an electronic circuit that is a circuit composed of hardware components such as an LSI (Large Scale Integration) incorporating a circuit for implementing a function for detecting change. It is also possible to implement the change detection device 100 using software by executing the change detection program 110 that carries out each of the above functions using the CPU 201 on a computer processing device. In this event, the CPU 201 loads the change detection program 110 stored in the auxiliary storage unit 206 into the main storage unit 202 for execution. The change detection device 100 is then implemented using software by controlling the operation of each part and carrying out each function.

Next, the operation of the change detection device 100 of this embodiment is explained with reference to the flowchart of FIG. 4 to FIG. 8G. The operation of the change detection device 100 is carried out as an operation on the CPU 201 with the change detection program 110 using the main storage unit 202, the presentation unit 203, the input unit 204, the interface 205, and the auxiliary storage unit 206 as resources.

Figure 4:
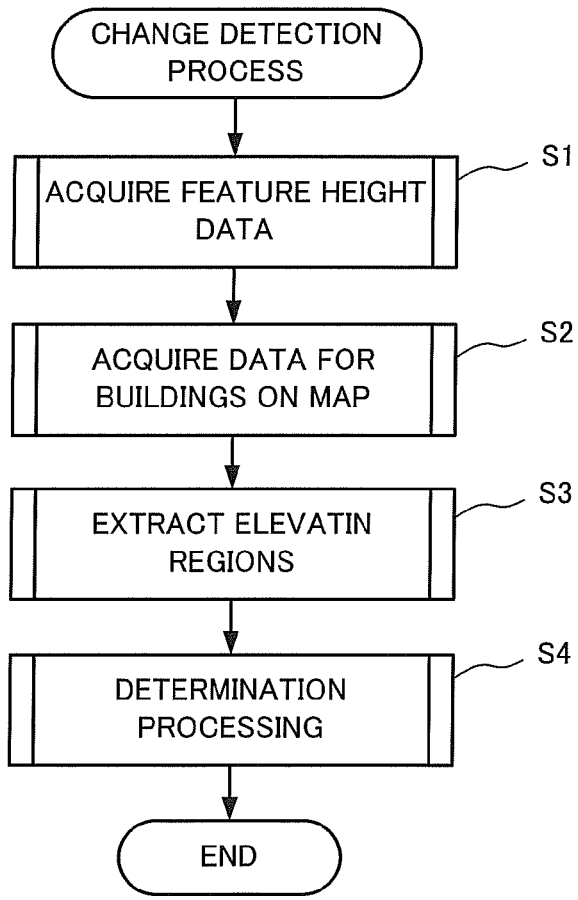
FIG. 4 is a flowchart showing an example of an operation of change detection processing of the embodiment of the present invention.

FIG. 4 is a flowchart showing an example of an operation of change detection processing of the embodiment of the present invention. The feature height calculating unit 60 makes the feature height data using the DSM data made by the stereo processing unit 50 and the mesh data inputted by the mesh data input unit 20 (step S1). The feature height calculating unit 60 passes over the feature height data to the elevation region extracting unit 70. The elevation region extracting unit 70 acquires the map building data via the map data input unit 30 (step S2). The elevation region extracting unit 70 receiving the feature height data extracts elevation regions that are heights over the predetermined threshold value (step S3).

The elevation region extracting unit 70, the demolition determination unit 80, and the new building determination unit 90 carry out change determination processing using methods employing elevation regions, map building data and predetermined threshold values (step S4). The elevation region extracting unit 70 calculates the surface area of elevation region depending on the respective cases for the demolition determination and the new building determination. The demolition determination unit 80 and the new building determination unit 90 then detect change in accordance with a method employing a predetermined threshold value.

In step S4, the elevation region extracting unit 70 calculates the surface area of the elevation region according to respective cases for the demolition determination and the new building determination in accordance with the elevation extraction threshold value and the determination type held in advance in the determination rule storage unit 41. In step S4, the elevation region extracting unit 70 calculates the surface area of the elevation region according to respective cases for the demolition determination and the new building determination in accordance with the demolition determination threshold value and the new building determination threshold value held in advance in the determination rule storage unit 41. The demolition determination unit 80 then carries out building demolition determinations based on these results and the new building determination unit 90 determines whether new buildings have been built.

Figure 5:
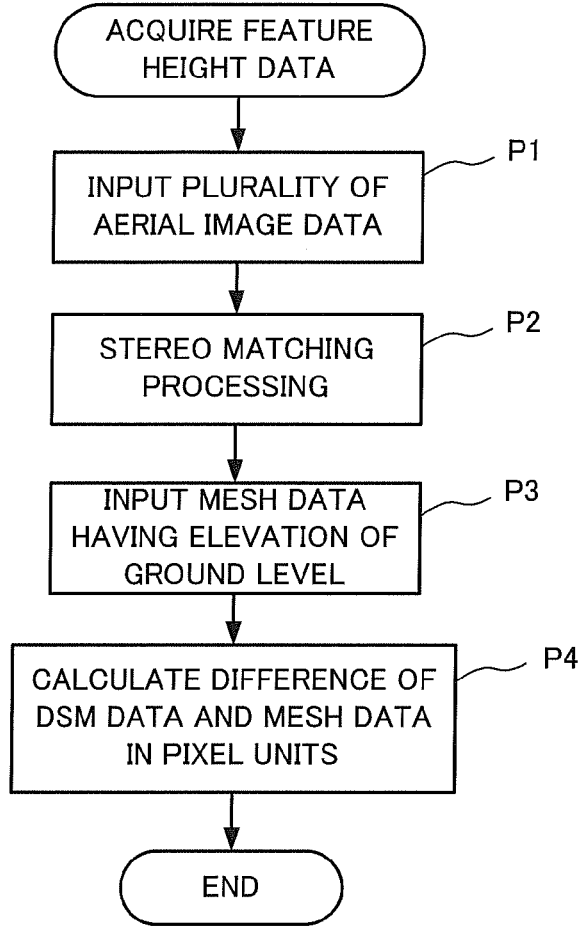
FIG. 5 is a flowchart showing an example of an operation that acquires feature height data.

FIG. 5 is a flowchart showing an example of an operation that acquires the feature height data shown in step S1 of FIG. 4.

First, the aerial image data input unit 10 inputs a number of items of aerial image data (step P1). During this time, the number of items of inputted aerial image data is the aerial image data taken from a number of different photographing points. For example, the image data for an aerial photograph 101A and the image data for an aerial photograph 101B shown in FIG. 9 is inputted. The inputted aerial image data is data that is taken after the data for making the map is fixed, in order to detect changes in the map.

The stereo processing unit 50 is inputted with a number of aerial images from the aerial image data input unit 10, carries out stereo matching processing, and extracts DSM data (step P2). On the other hand, the mesh data input unit 20 is inputted with mesh data for the change detection target region (step P3).

The feature height calculating unit 60 is inputted with DSM data extracted at the stereo processing unit 50 and mesh data inputted by the mesh data input unit 20. The feature height calculating unit 60 then obtains the differential of the DSM data and the mesh data in pixel units and extracts feature height data (step P4).

In the above, it is possible to acquire the feature height data shown in step S1 of FIG. 4.

Figure 6:
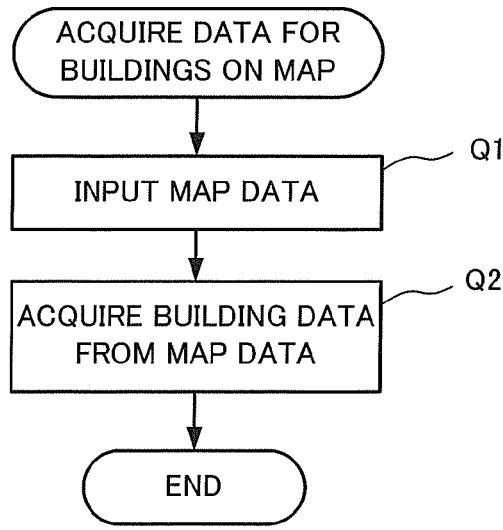
FIG. 6 is a flowchart showing an example of an operation that acquires building data on a map.

FIG. 6 is a flowchart showing an example of an operation that acquires the map building data shown in step S2 of FIG. 4.

The map data input unit 30 inputs map building data (step Q1). The inputted map data holds information for features such as houses and roads. The map data has to be assigned with position information such as longitude and latitude of features in the map data and/or information correlating ranges expressed by a map and specific ranges in the real world. Information such as for roads and blocks is included in the map data. Just building data is therefore extracted from the map data (step Q2). In the above, map building data shown in step S2 of FIG. 4 is acquired.

Figure 7:
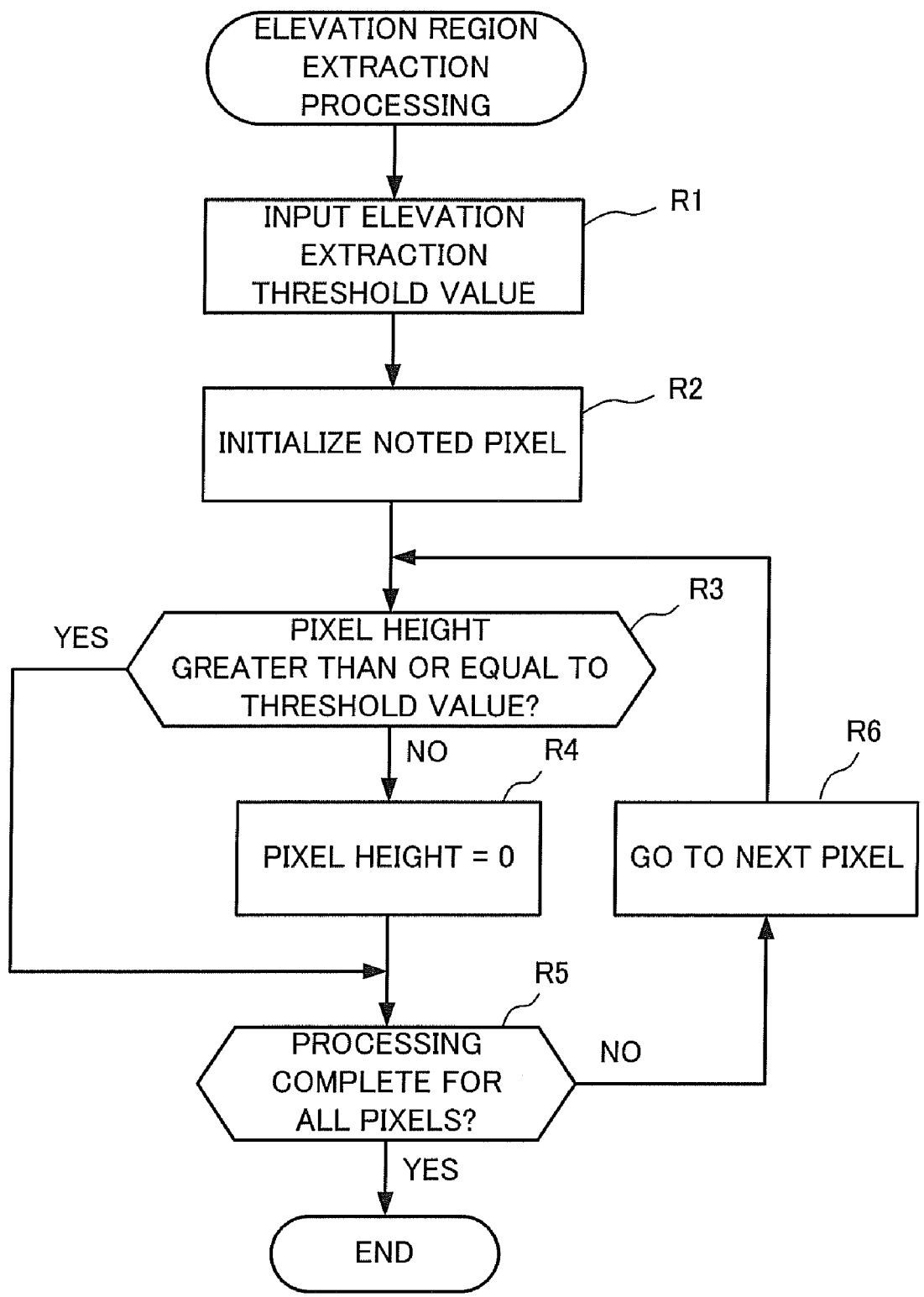
FIG. 7 is a flowchart showing an example of an operation of elevation region extraction processing.

The processing for extracting elevation regions shown in step S3 of FIG. 4 is the processing of elevation extraction processor 71 of the elevation region extracting unit 70 (refer to FIG. 2). FIG. 7 is a flowchart showing an example of the operation for elevation region extraction processing at the elevation extraction processor 71.

The elevation extraction processor 71 is inputted with an elevation extraction threshold value held in advance in the determination rule storage unit 41 (step R1). An initial value indicating a noted pixel is then set (step R2). A "noted pixel" indicates the pixel currently being processed in initialization where an arbitrary pixel is taken as a first noted pixel.

The elevation extraction processor 71 determines whether or not feature height data for this pixel is an elevation extraction threshold value or more for the noted pixel (step R3). When the feature height data for the noted pixel is less than the elevation extraction threshold value (step R3; NO), the value of the feature height for this pixel is taken to be 0 (step R4). Further, when the feature height data for the noted pixel is the elevation extraction threshold value or more (step R3; YES), a value for the feature height of this pixel is taken as it is.

It is then determined whether or not processing is carried out for all of the pixels (step R5). When processing is not carried out for all of the pixels (step R5; NO), another as yet-unprocessed pixel is taken to be the noted pixel (step R6), and the processing of step R3 is executed again. When processing is carried out for all of the pixels (step R5; YES), the elevation region extraction processing ends.

As a result of the above, it is possible to hold just regions of a height greater than a threshold value designated by the users from the feature height data and it is possible to generate extracted feature height data.

Next, a description is given of the details of the operation of the determination processing (step S4) for a flowchart of FIG. 4. FIG. 8A to FIG. 8G are flowcharts illustrating separation of the operations for determination processing of step S4 with respect to each section.

Figure 8A:
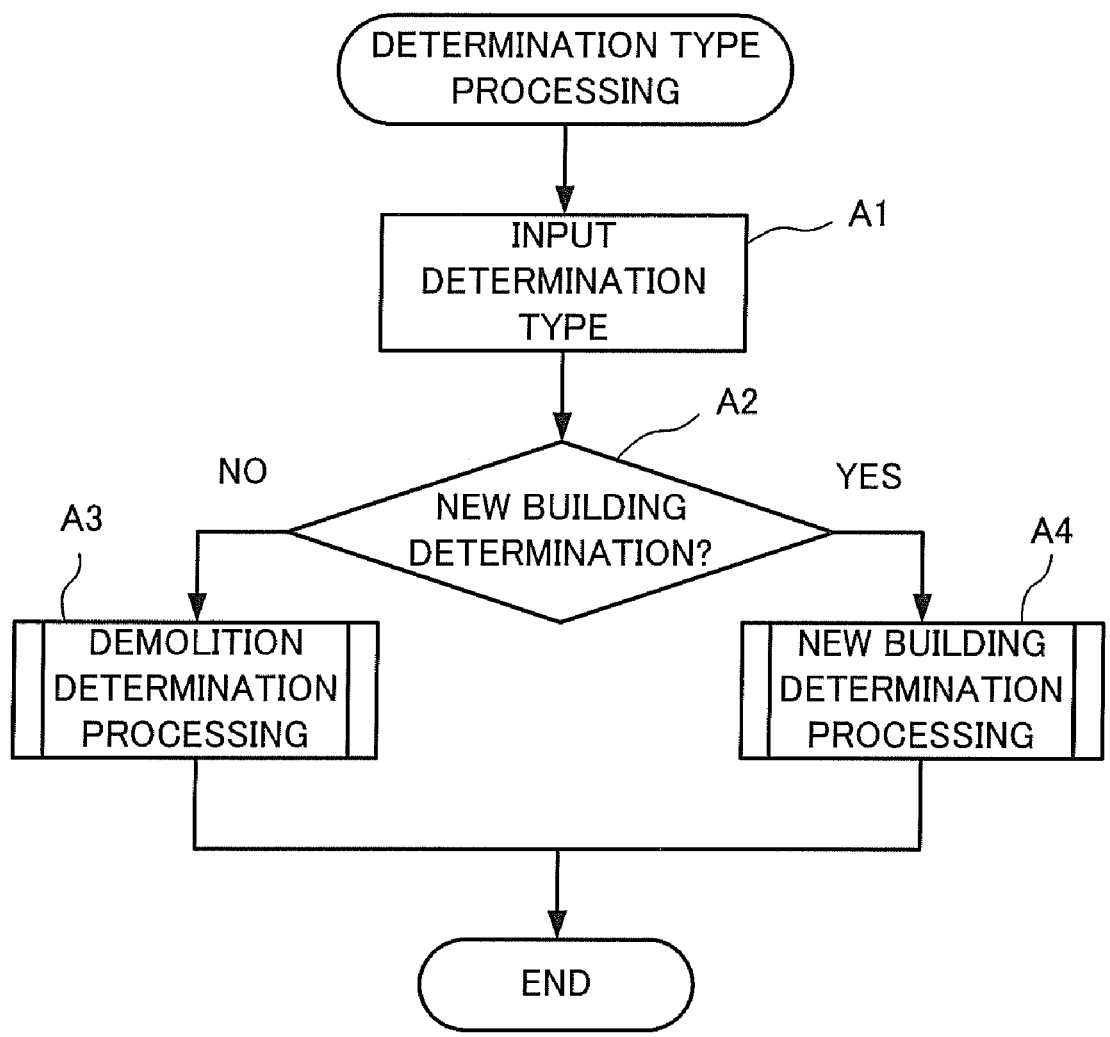
FIG. 8A to 8G are flowcharts showing examples of operations for determination processing.

FIG. 8A is a flowchart showing an example of an operation for determination type processing at the elevation region extracting unit 70. The determination type processor 72 (refer to FIG. 2) is inputted with a determination type held in advance at the determination rule storage unit 41 (step A1). It is then determined whether the inputted determination type is a new building or a demolished building (step A2).

When the inputted determination type is a demolition (step A2; NO), the processing after this is taken to carry out a demolition determination (step A3). When the inputted determination type is a new building (step A2; YES), the processing after this is taken to carry out a new building determination (step A4).

The processing is therefore divided up into demolition determination processing and new building determination processing as a result of the users inputting the determination type.

Figure 8B:
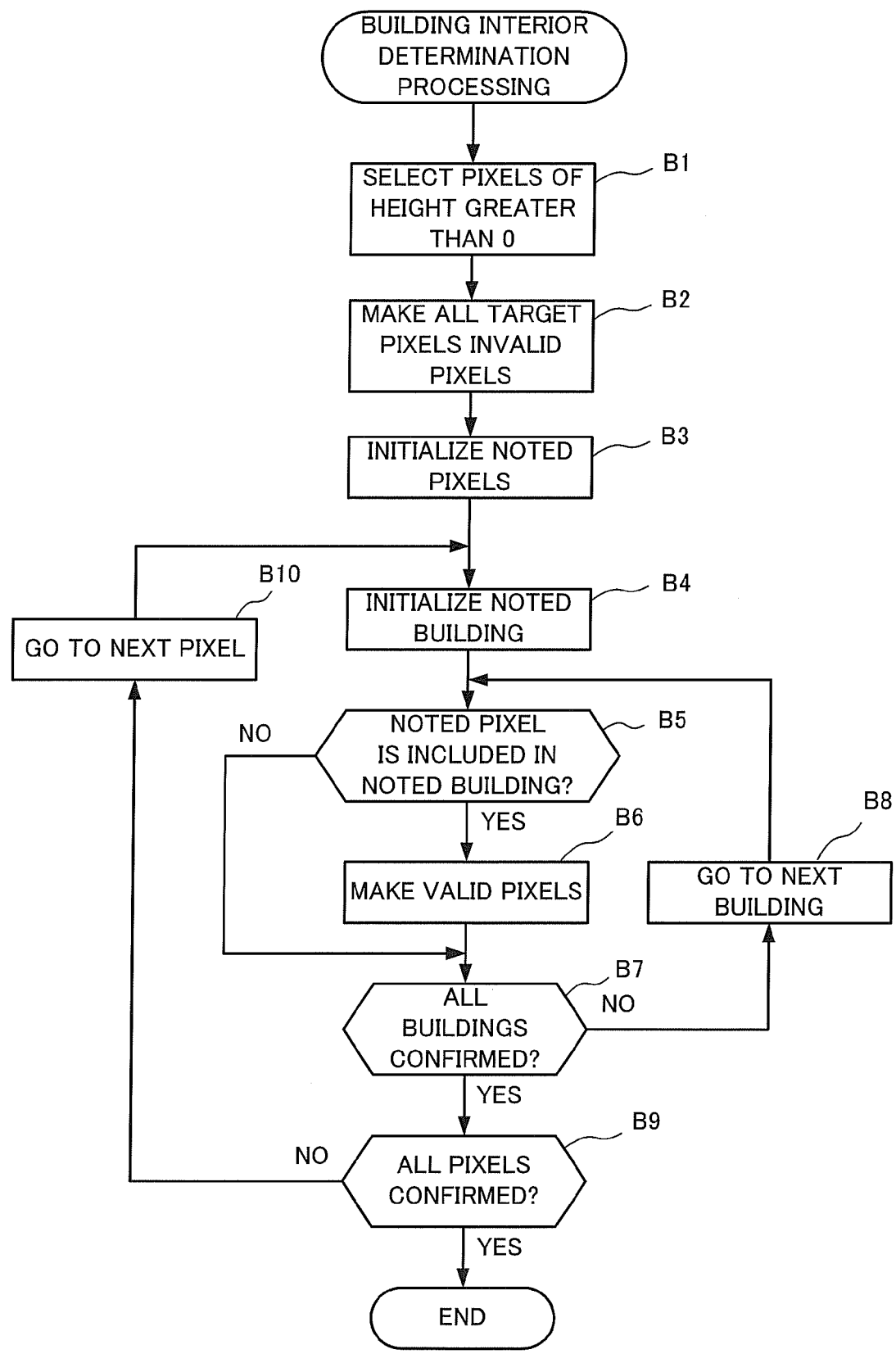

FIG. 8B is a flowchart showing an example of an operation for building interior determination processing at the elevation region extracting unit 70.

The building interior determination unit 73 (refer to FIG. 2) selects pixels from the extracted feature height data with a height greater than zero (step B1). Namely, pixels having a height of less than the feature extraction threshold value in the processing of FIG. 7 are taken to be feature height data of 0. Pixels subject to processing are therefore pixels for feature height data that is the elevation extraction threshold value or more.

The building interior determination unit 73 therefore holds valid and invalid data for pixels for all of the extracted feature height data and initializes all of the pixels in an invalid state (step B2). Further, initial values indicating the noted pixel are then set as with the step R2 of FIG. 7 (step B3).

The building interior determination unit 73 sets an initial value indicating a noted building (step B4). A noted building is a building within a change detection target region currently being processed, with an arbitrary building being initialized as a first noted building.

It is then determined whether or not the noted pixels are in the noted building region (step B5). The symbol ⊂ denotes that a noted pixel is included in the range of the noted building. A method using vectors from noted pixels to end points of noted buildings and a method counting intersection points of a straight lines passing through noted pixels and outlines of noted buildings exist as methods for determining whether or not a noted pixel is in a noted building region. The method is, however, by no means limited to these methods.

When a noted pixel is in a noted building region (step B5; YES), feature height data extracted for this pixel is made to be valid (step B6). When the noted pixel is out of the noted building region (step B5; NO), the extracted feature height data for this pixel is taken to remain invalid.

Next, the building interior determination unit 73 determines whether or not processing on all of the buildings is carried out (step B7). When processing is not carried out for all of the buildings (step B7; NO), another as yet-unprocessed building is taken to be the noted building (step B8), and the processing of step B5 is executed again.

When processing is carried out on all of the buildings (step B7; YES), it is determined whether or not processing is carried out on all of the pixels (step B9). When processing is not carried out for all of the pixels (step B9; NO), another as yet-unprocessed pixel is taken to be the noted pixel (step B10), and the processing of step B4 is executed again. When processing is carried out for all of the pixels (step B9; YES), the building interior determination process ends.

As a result of the above, it is therefore possible to extract just regions of a height within a building on a map from extracted feature height data and it is possible to acquire inner building elevation regions.

Figure 8C:
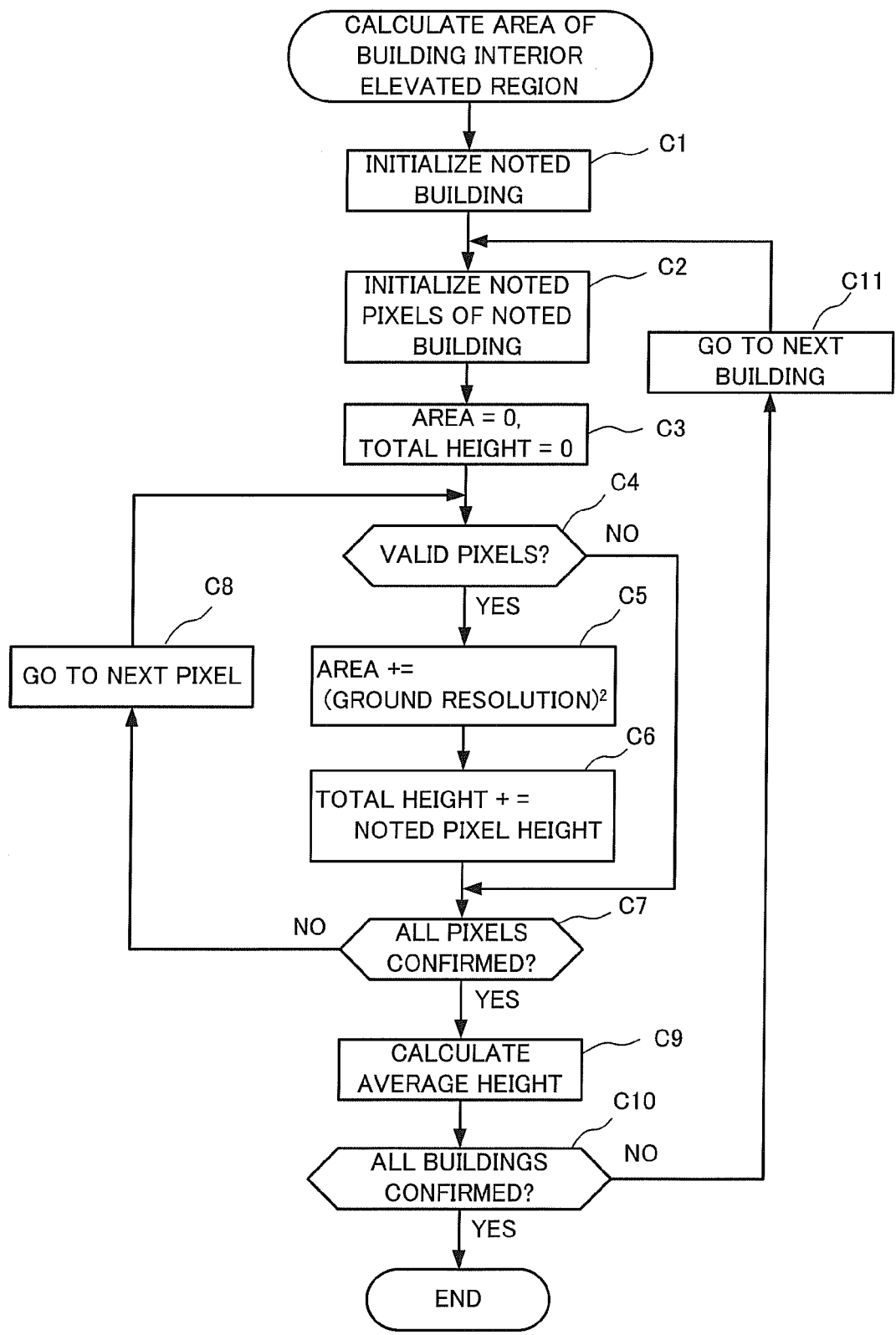

FIG. 8C is a flowchart showing an example of an operation for calculating an area of inner building elevation regions at the elevation region extracting unit 70.

The inner building elevation region area calculating unit 74 sets an initial value indicating a noted building (refer to FIG. 2) (step C1). An initial value indicating a noted pixel is then set for a pixel within the noted building (step C2). A variable "area" is then initialized to zero for an elevation region within the noted building, and the variable "total height" is initialized to zero for within the noted building (step C3).

The inner building elevation region area calculating unit 74 then determines whether or not the noted pixel is a valid pixel (step C4). If the noted pixel is not a valid pixel (step C4; NO), then this pixel is not subjected to processing. If the noted pixel is valid (step C4: YES), the square of the ground resolution, i.e. the area per one pixel, is added to the variable "area" (step C5). "Ground resolution" is the distance in the real world per one pixel. Further, the height of the feature for the valid pixel is added to the variable "height total" (step C6). The symbol += for step C6 and C7 indicates that the value for the right side is added to the value for the variable for the left side and the value is stored in the variable for the left side again.

The inner building elevation region area calculating unit 74 then determines whether or not processing has been carried out for all of the pixels within the noted building (step C7). When processing has not been carried out for all of the pixels (step C7; NO), a pixel not as yet processed for the noted building is taken as the noted pixel (step C8), and the processing of step C4 is executed again. If the processing for all of the pixels in the noted building has been carried out (step C7; YES), the value for the height total is divided by the number of valid pixels in the noted building and an average value for the height is acquired (step C9).

Then, as with step B7 of FIG. 8B, it is determined whether or not processing has been carried out for all of the buildings (step C10). When processing is not carried out for all of the buildings (step C10; NO), another as yet-unprocessed building is taken to be the noted building (step C11), and the processing of step C2 is executed again. When processing is carried out for all of the buildings (step C10; YES), the area calculating processing for inner building elevation regions ends.

It is therefore possible to acquire the area of inner building elevation regions from the inner building elevation regions.

Figure 8D:
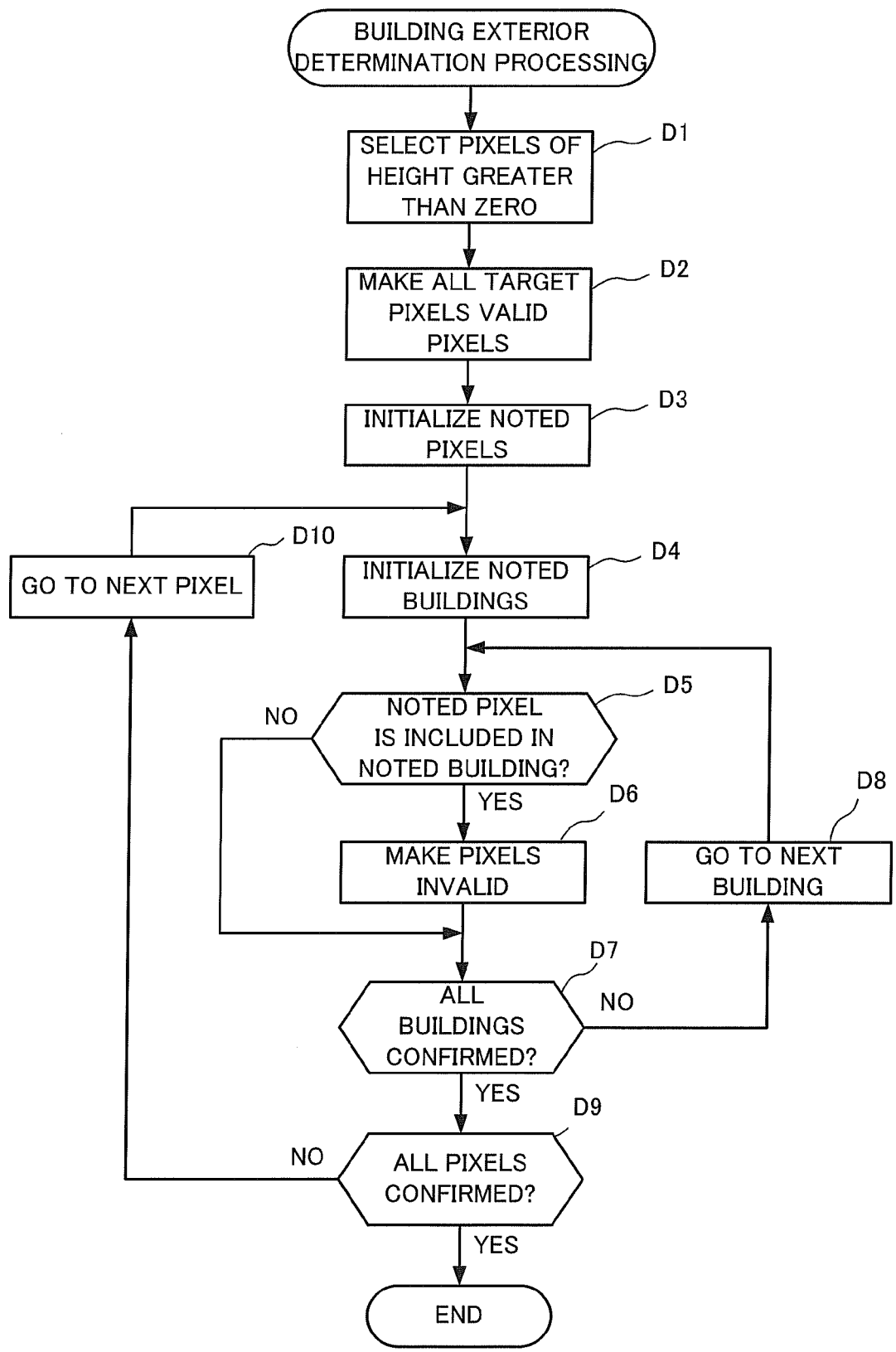

FIG. 8D is a flowchart showing an example of an operation for building exterior determination processing at the elevation region extracting unit 70.

The building exterior determination unit 75 (refer to FIG. 2) then selects pixels of a height greater than zero for the extracted feature height data as with step B1 of FIG. 8B (step D1). All of the pixels for the extracted feature height data are then initialized to being valid so as to hold valid or invalid data (step D2). An initial value indicating a noted pixel is then set (step D3). Further, initial values indicating the noted building are then set as with the step B4 of FIG. 8B (step D4).

The building exterior determination unit 75 then determines whether or not the noted pixels are inside the noted building (step D5) as in step B5 of FIG. 8B. When a noted pixel is in a noted building region (step D5; YES), feature height data extracted for this pixel is made invalid (step D6). When the noted pixel is out of the noted building region (step D5; NO), the extracted feature height data for this pixel is taken to remain valid.

It is then determined whether or not processing is carried out for all of the buildings (step D7). When processing is not carried out for all of the buildings (step D7; NO), another as yet-unprocessed building is taken to be the noted building (step D8), and the processing of step D5 is executed again.

When processing is carried out on all of the buildings (step D7; YES), it is determined whether or not processing has been carried out on all of the pixels (step D9). When processing is not carried out for all of the pixels (step D9; NO), another as yet-unprocessed pixel is taken to be the noted pixel (step D10), and the processing of step D4 is executed again. When processing is carried out for all of the pixels (step D9; YES), the building exterior determination process ends.

As a result of the above, it is therefore possible to extract just regions of a height out of a building region on a map from extracted feature height data and it is possible to acquire outer building elevation regions. Further, processing of the outer building elevation region labeling unit 76 is carried out after the building exterior determination unit 75 at the elevation region extracting unit 70, and labels are assigned to the outer building elevation regions.

Figure 8E:
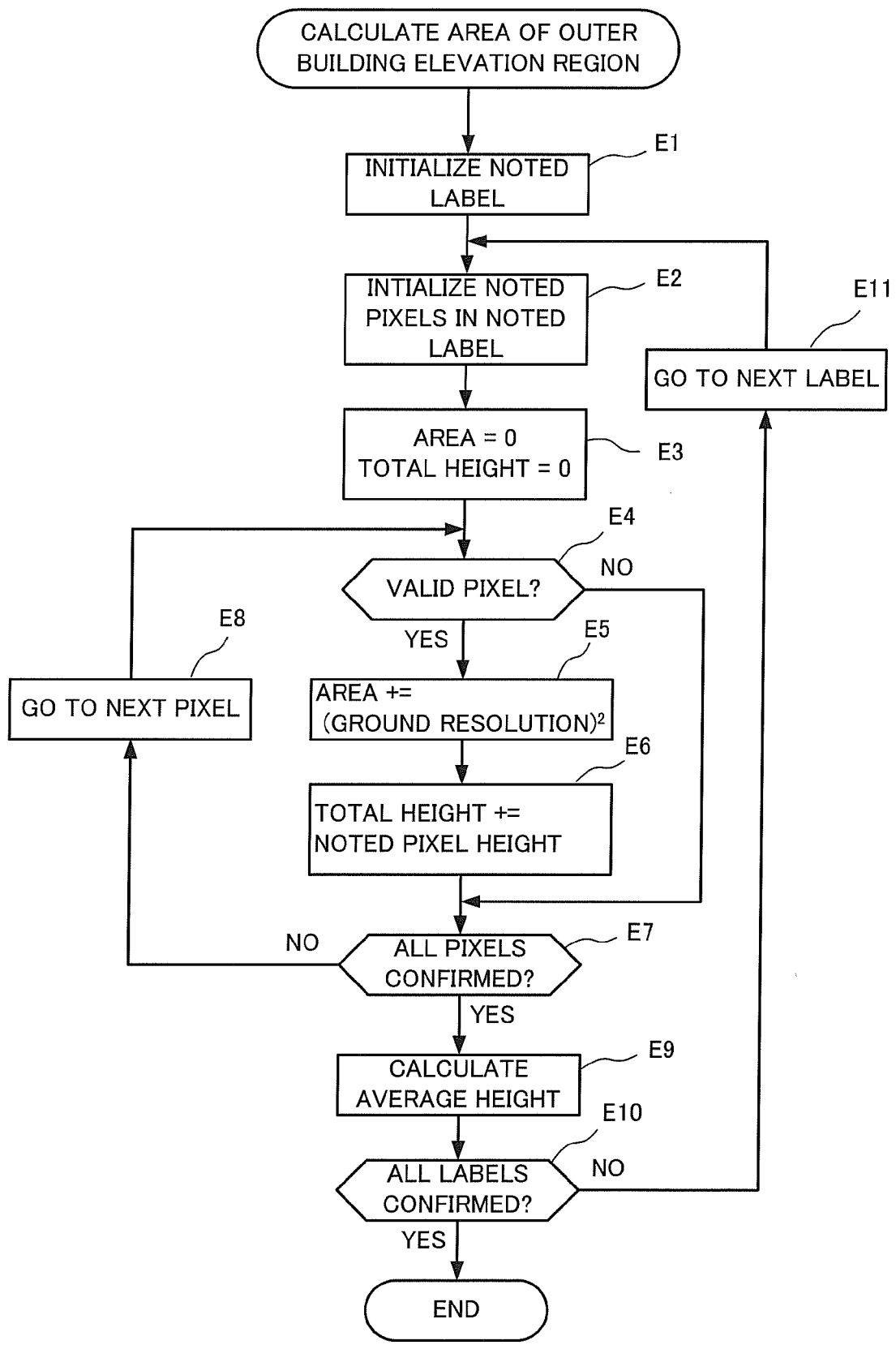

FIG. 8E is a flowchart showing an example of an operation for calculating the area of outer building elevation regions at the elevation region extracting unit 70. The outer building elevation region area calculating unit 77 (refer to FIG. 2) first sets an initial value indicating a noted label (step E1). A "noted label" is a label for an outer building elevation regions extracted from the change detection target region currently being processed and is initialization where an arbitrary label is taken to be an initial noted label. Initial values indicating noted pixels are then set for pixels within the noted label (step E2). The variable "area" is then initialized to zero for the elevation region within the noted label, and a variable "height total" within the noted label is initialized to zero (step E3).

The outer building elevation region area calculating unit 77 then determines whether or not the noted pixel is a valid pixel (step E4). If the noted pixel is not a valid pixel (step E4; NO), then this pixel is not subjected to processing. If the noted pixel is valid (step E4; YES), the square of the ground resolution, i.e. the area per one pixel, is added to the variable "area" (step E5), as in step C5 of FIG. 8C. Further, the height of the feature of the valid pixel is added to the variable "height total" as in step C6 of FIG. 8C (step E6).

It is then determined whether or not processing is carried out for all of the pixels within the noted label (step E7). When processing is not carried out for all of the pixels (step E7; NO), an as yet-unprocessed pixel of the noted label is taken as a noted pixel (step E8) and the processing of step E4 is executed again. When processing is carried out for all of the pixels within the noted label (step E7; YES), the value for the total height is divided by the number of valid pixels within the noted label so as to acquire an average value for height (step E9).

The outer building elevation region area calculating unit 77 then determines whether or not processing is carried out for all of the labels after calculating the average height of the pixels of the noted label (step E10). When processing is not carried out for all of the labels (step E10; NO), another as yet-unprocessed label is taken as the noted label (step E11), and the processing of step E2 is executed again. When processing is carried out for all of the labels (step E10; YES), the process for calculating the area of the building exterior elevation region is complete.

It is therefore possible to acquire the area of outer building elevation regions from the outer building elevation regions.

Figure 8F:
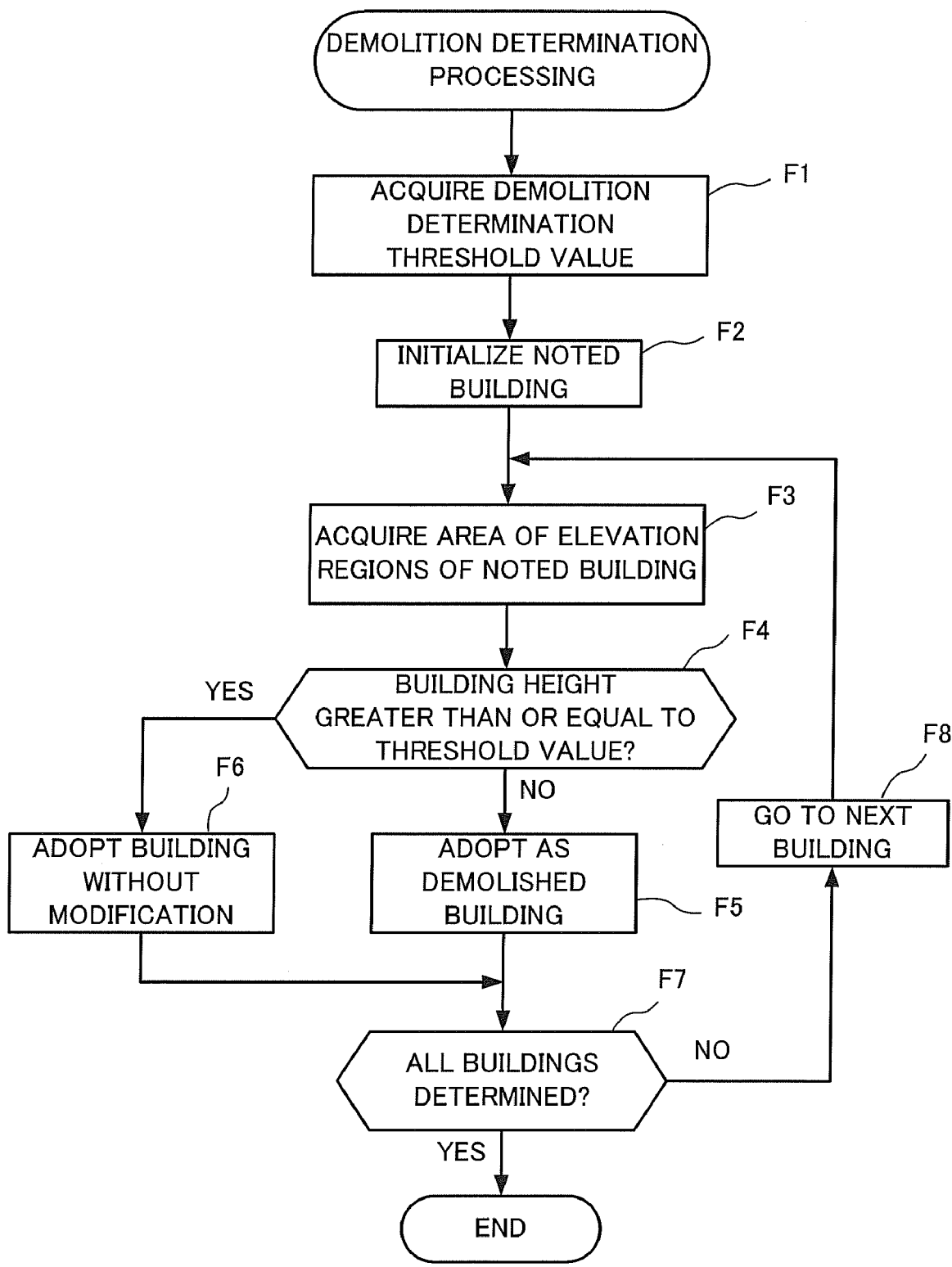

FIG. 8F is a flowchart showing an example of an operation for the demolition determination process of the determination process shown in step S4 of FIG. 4.

The demolition determination unit 80 is inputted with a demolition determination threshold value held in advance in the determination rule storage unit 41 (step F1). Initial values indicating the noted building are then set as with the step B4 of FIG. 8B (step F2). The area of the elevation region of the noted building is then inputted from the value calculated at the elevation region extracting unit 70 (step F3).

The demolition determination unit 80 then determines whether or not the area of the elevation region of the noted building is the threshold value or more (step F4). The threshold value used in the determination does not have to be the area. The threshold value can also be a proportion of the area of the elevation region with respect to the area of the noted building. When the area of the elevation region of the noted building is less than the threshold value (step F4; NO), the building is taken to be demolished (step F5). When the area of the elevation region of the noted building is the threshold value or more (step F4; YES), the building is taken to be a building that has not changed (step F6).

The demolition determination unit 80 determines whether or not processing is carried out on all of the buildings (step F7). When processing is not carried out for all of the buildings (step F7; NO), another as yet-unprocessed building is taken to be the noted building (step F8), and the processing of step F3 is executed again. When processing is carried out for all of the buildings (step F7; YES), the demolition determination processing ends.

In the above, it is possible to detect demolished buildings from within target regions for target regions on the map from the area of inner building elevation regions.

Figure 8G:
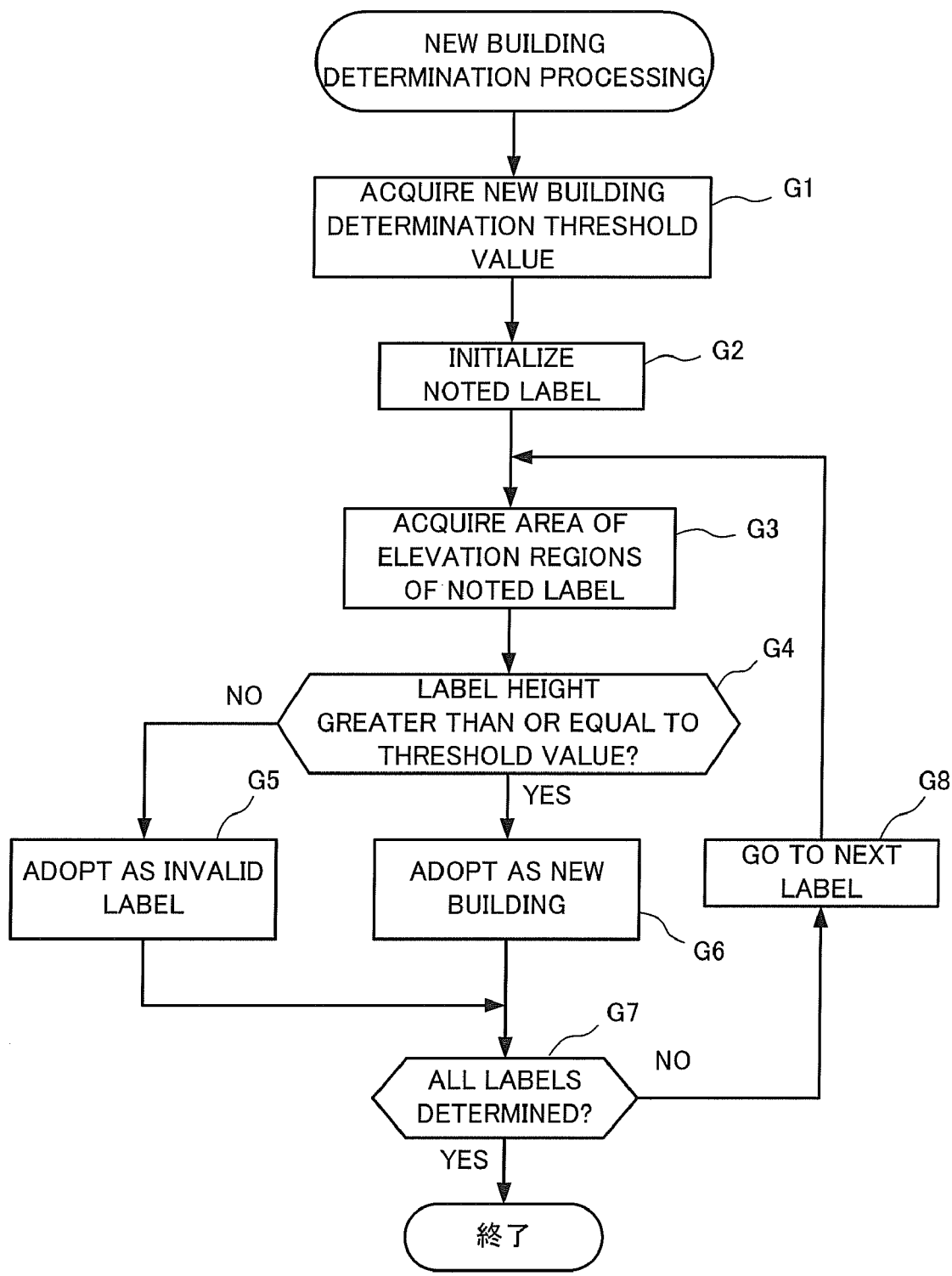

FIG. 8G is a flowchart showing an example of an operation for the new building determination process of the determination process shown in step S4 of FIG. 4.

The new building determination unit 90 is inputted with a new building determination threshold value held in advance in the determination rule storage unit 41 (step G1). Initial values indicating a noted label are then set as with the step E1 of FIG. 8E (step G2). The area of the elevation region of the noted label is then inputted from the value calculated at the elevation region extracting unit 70 (step G3).

The new building determination unit 90 then determines whether or not the area of the elevation region of the noted label is the threshold value or more (step G4). The threshold value used in the determination does not have to be the area. The threshold value can also be a proportion of the area of the elevation region with respect to the area of the noted label. When the area of the elevation region of the noted label is less than the threshold value (step G4; NO), the label is made invalid (step G5). When the area of the elevation region of the noted label is the threshold value or more (step G4; YES), the label is made to be a new building (step G6). Typically, noted labels of a fixed area or more are taken to be new buildings when the proportion of the area of an elevation region with respect to the area of a noted label is a predetermined value or more.

As with step E10 of FIG. 8E, the new building determination unit 90 determines whether or not processing is carried out for all of the labels (step G7). When processing is not carried out for all of the labels (step G7; NO), an as yet-unprocessed building is taken to be the noted label (step G8), and the processing of step G3 is executed again. When processing is carried out for all of the labels (step G7; YES), the new building determination processing ends.

In the above, it is possible to detect new buildings for target regions on the map from the area of outer building elevation regions.

The following effects are achieved by the embodiment explained above.

Firstly, it is possible to detect demolition of features on a map from the height of the feature. This is because it is possible to correlate the height of a feature and information of a map with a high degree of precision by comparing feature height data obtained from stereo matching processing and feature height calculation processing of aerial image data and a map.

Secondly, it is possible to detect new buildings from the heights of features. This is because it is possible to detect information for features that do not exist on the map by extracting elevation regions from feature height data obtained from stereo matching processing and feature height calculation processing of aerial image data.

Thirdly, it is possible to prevent detection omissions resulting from manual operations. This is because manual operations are no longer necessary because the detection operation is automated.

Fourthly, it is possible to determine changes in features on the map at low cost. This is because it is possible to process the detection operation at a higher speed than when this is performed manually as a result of having automated the detection operation.

APPLIED EXAMPLE

An applied example explained in the following is an example of a specific application to a change detection device shown in the embodiment of the present invention. The applied example adopts the same basic configuration and basic operation as the embodiment. The following is mainly a description of points of distinction with the embodiment, with aspects of the configuration and operation that are common to the embodiment being omitted from the description as appropriate.

A detailed description for a process up to extracting extracted feature height data is given with reference to FIG. 11 to FIG. 15.

Figure 11:
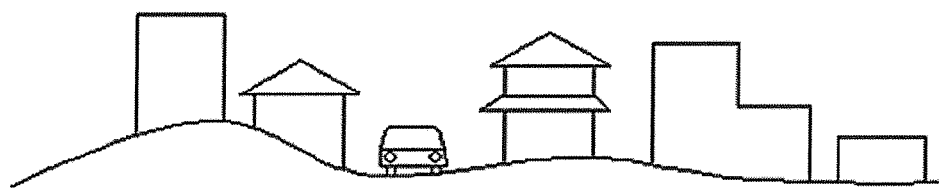
FIG. 11 is a schematic view showing an example of a situation on the ground in the real world.

FIG. 11 is a schematic view showing an example of a situation on the ground in the real world. FIG. 11 shows a real world partial cross-section, with features existing on undulating geographical features.

Figure 12:
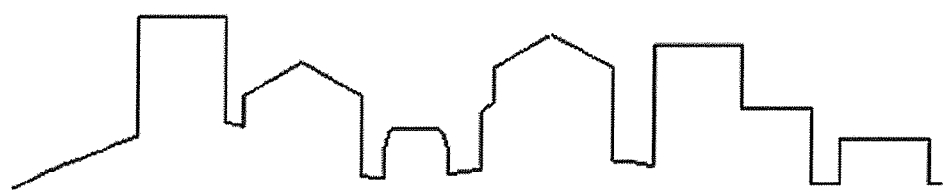
FIG. 12 is a schematic view showing an example of DSM data.

FIG. 12 is a schematic view showing DSM data generated by stereo matching processing from aerial images taken partially in the real world shown in FIG. 11. The DSM data expresses data for the higher most surface and includes roof height data for ground level concealed by the roof etc.

Figure 13:
FIG. 13 is a schematic view showing an example of mesh data.

FIG. 13 is a schematic view showing an example of mesh data. Mesh data is data, of the height data, included the height (altitude) of only ground level.

Figure 14:
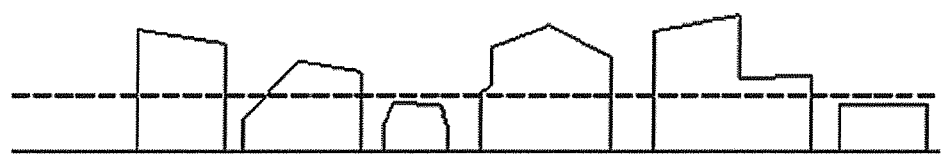
FIG. 14 is a schematic view showing an example of feature height data.

FIG. 14 is a schematic view showing an example of feature height data. A dotted line depicted in FIG. 14 denotes the height of the elevation extraction threshold value specified by the user.

Figure 15:
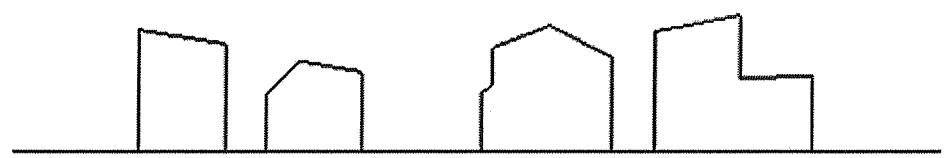
FIG. 15 is a schematic view showing an example of extracted feature height data.

FIG. 15 is a schematic view showing an example of feature height data for which extraction is complete. The extracted feature height data is data taking a height of less than an elevation extraction threshold value depicted in FIG. 14 as zero. It can therefore be understood that low buildings and vehicles are eliminated, as depicted in FIG. 14.

A detailed description of the results of processing when the flowchart of FIG. 4 is applied is given with reference to FIG. 16 to FIG. 25. The numerals depicted in FIG. 16 to FIG. 21 are height at each pixel, and the locations surrounded by a thick black line are the positions of buildings on the map.

Figures 16, 17:
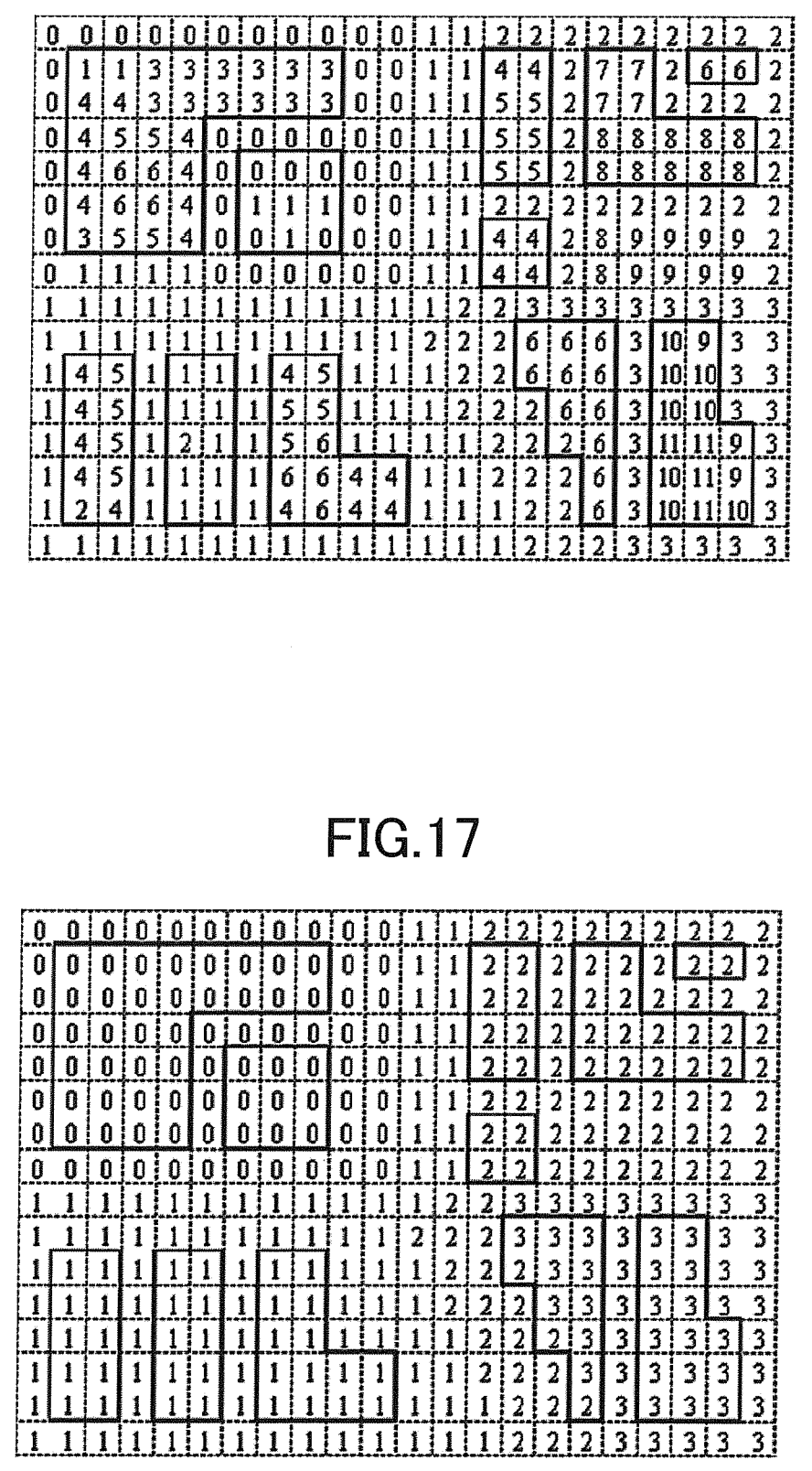

FIG. 16 is a schematic diagram showing an example of actual DSM data. The heights of each point in FIG. 16 are results obtained as a result of the processing of the stereo processing unit 50 and the heights of the buildings are added to the elevation values.

FIG. 17 is a schematic diagram showing an example of actual mesh data. The height of each pixel of FIG. 17 is a value inputted to the mesh data input unit 20 and is the elevation value.

Figures 18, 19:
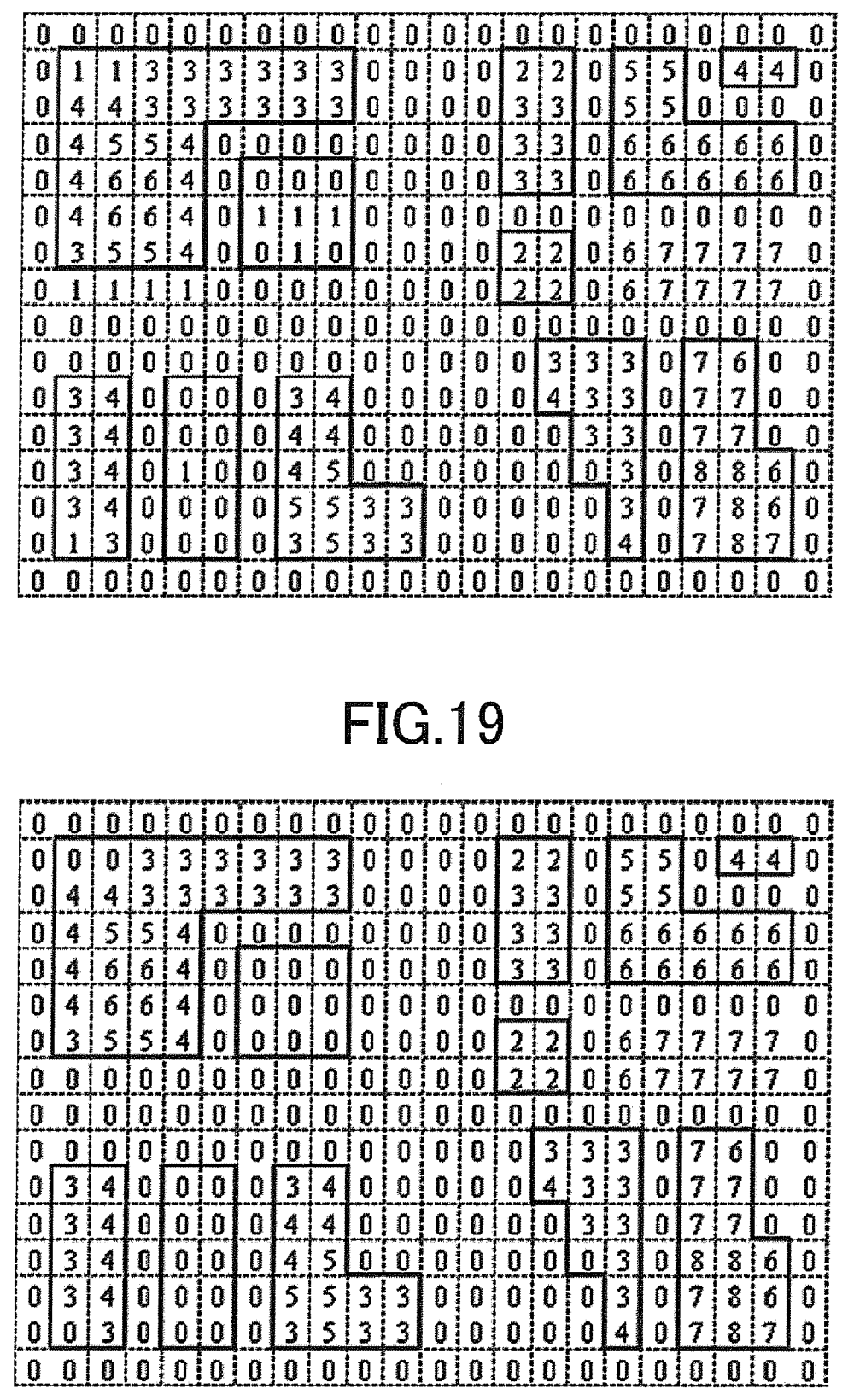

FIG. 18 is a schematic diagram showing an actual example of feature height data. The heights of each pixel of FIG. 18 are results obtained as a result of the processing of the feature height calculating unit 60. The feature height is the value of FIG. 17 subtracted from the value of FIG. 16 and denotes the height of the feature in the real world.

FIG. 19 is a schematic diagram showing an actual example of extracted feature height data. The heights of each pixel of FIG. 19 are results obtained as a result of the processing of the elevation extraction processor 71. In FIG. 19, an elevation extraction threshold value is taken to be 2, and feature heights of the feature heights of FIG. 18 that are less than 2 are taken to be zero. Of the feature heights of FIG. 19, locations within a region surrounded by a thick black line that is a feature, where the extracted feature heights are larger than zero, are inner building elevation regions.

The elevation extraction processor 71 only extracts pixels of heights greater than or equal to the threshold value. There are therefore cases where the extracted feature height data is not extracted using the same shape as a house outline. For example, in the case of houses etc. the height of the upper surface of the roof is not fixed. It is therefore possible that locations of a low height may not be included in extracted feature height data. It is also similarly possible that cases where a building actually exists but the height of the feature is less than the threshold value may not be included in the extracted feature height data.

Of the feature heights of FIG. 19, locations out of a region surrounded by a thick black line that is a feature, where the extracted feature heights are larger than zero, are outer building elevation regions.

Figures 22, 23:
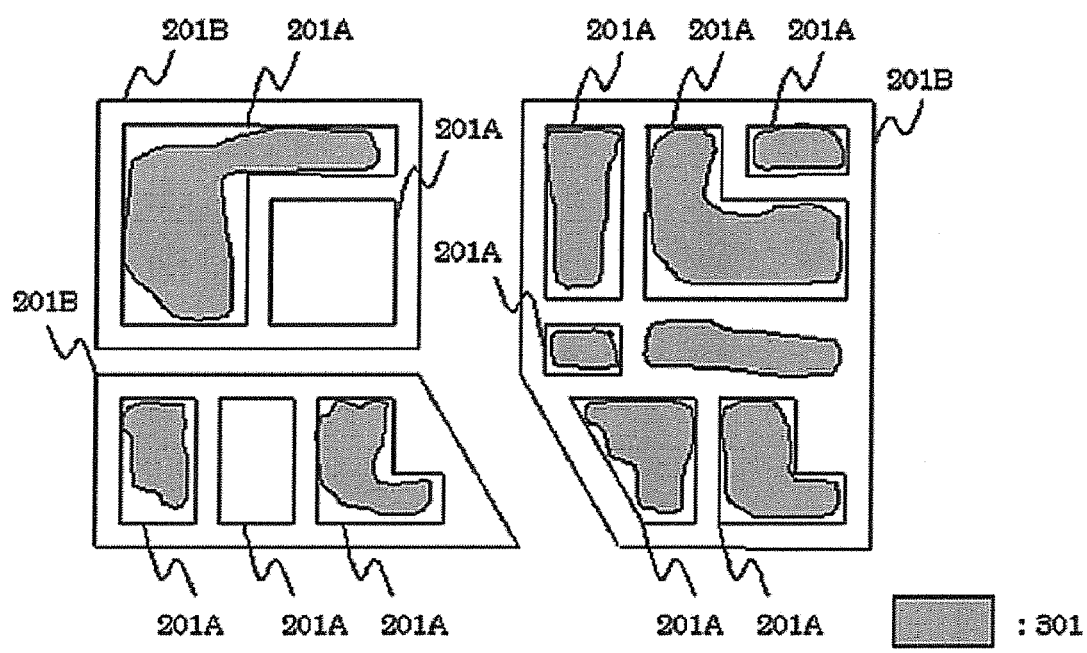
FIG. 22 is a schematic view showing an example of change detection results on a map of an applied example.
FIG. 23 is a schematic view showing an example of feature height data.

FIG. 23 is a schematic view showing an example of detection results of FIG. 19. In FIG. 23, elevation region data 301 is depicted on the map data shown in FIG. 10. The DSM data obtained as a result of the stereo matching processing contains the height of stationary vehicles etc. However, it is also possible to not extract feature height data for roads by making the feature height data zero when a noted pixel is not within the block 201B by using the block 201B on the map.

Figures 20, 21:
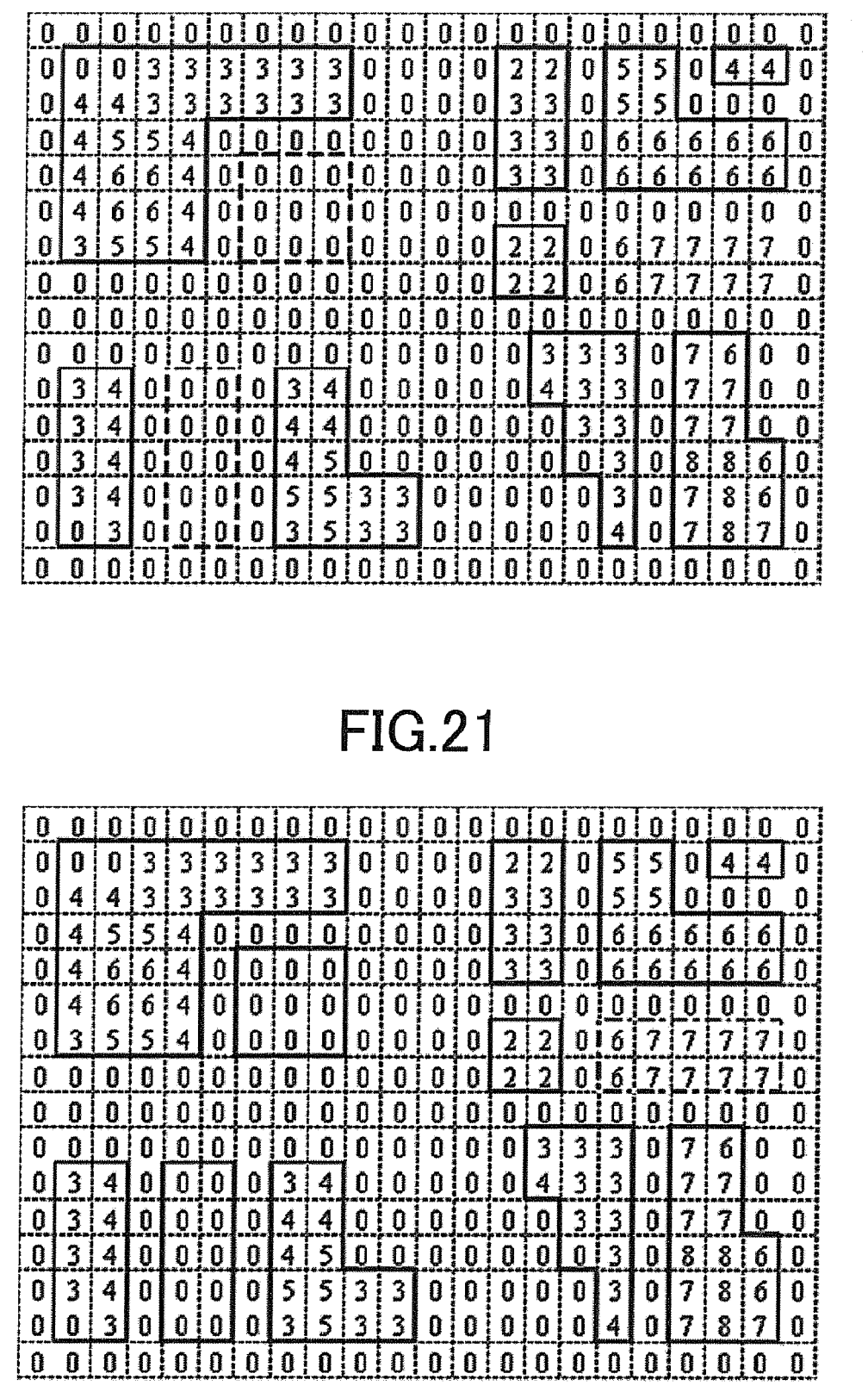

FIG. 20 is a schematic diagram showing an example of actual demolition detection results. FIG. 20 shows results obtained as a result of the processing of the demolition determination unit 80. In FIG. 20, regions encompassed by a dashed line denote demolished buildings. In the example of FIG. 20, as a demolition determination threshold value, buildings where an occupied percentage of the area of inner building elevation regions is less than 50 percent are taken as being demolished, while other buildings are detected as not having changed.

Specifically, a building detected as being demolished on the upper left of FIG. 20, and a building detected as being demolished on the lower left have an area of inner building elevation regions of zero and are detected as being demolished. Further, pixels of a height of zero exist at the building detected as not having changed at the upper left of FIG. 20. However, the proportion of the area of the inner building elevation regions that is occupied by the area of the building is 93.75 percent and is larger than the condition of 50 percent set as the demolition determination threshold value. The building is therefore detected as not having changed.

Figure 24:
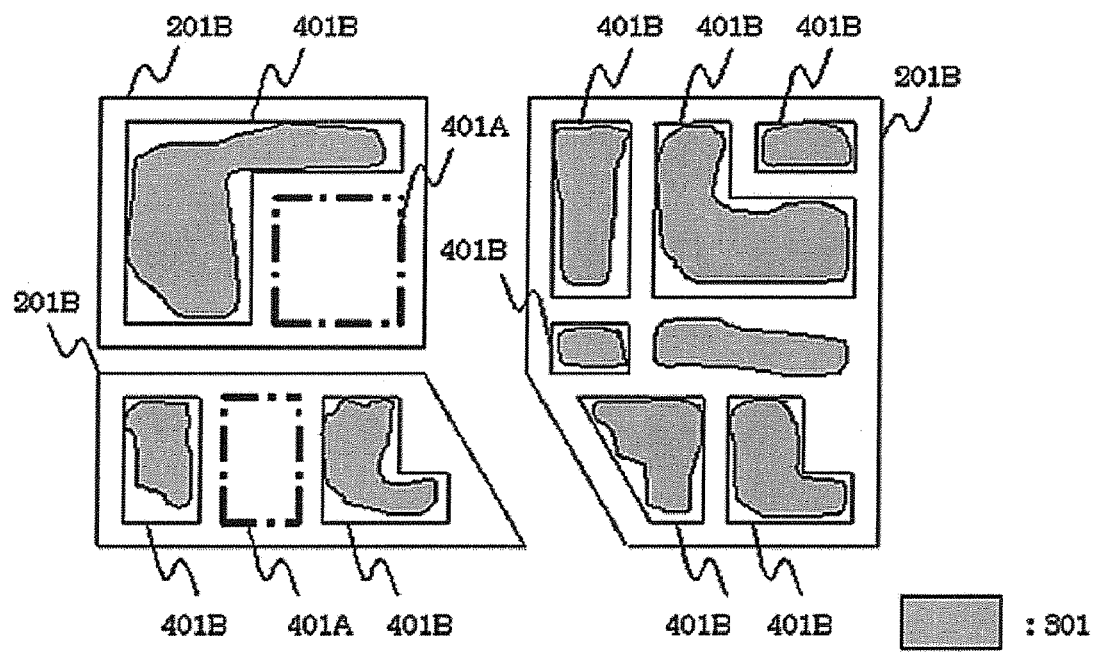
FIG. 24 is a schematic view showing an example of demolition determination results.

FIG. 24 is a schematic diagram showing an example of demolition determination detection results. In FIG. 24, for the building 201A of the map data and extracted feature height data shown in FIG. 23, a building demolished on the map 401A is depicted by dashed lines, and a building remaining as is on the map 401B is depicted by a solid line. As described above, inner building elevation regions does not always match with the building shape on the map but it is possible to determine demolitions with a high degree of precision by determining whether or not a proportion of the area of inner building elevation regions is a threshold value or more for all of the buildings within a target region on a map using the demolition determination threshold value.

FIG. 21 is a schematic diagram showing an example of actual new building detection results. FIG. 21 shows results obtained as a result of the processing of the new building determination unit 90. In FIG. 21, a region surrounded by a dotted line indicates a new building. In the example in FIG. 21, a building with an area of an outer building elevation regions of two pixels or more is detected as a new building as a new building threshold value. Specifically, a region detected as a new building on the right side of FIG. 21 has an area of an inner building elevation regions of 10 pixels. The value of 10 pixels is larger than the conditions of two pixels set as the new building determination threshold value and the region is therefore detected as a new building.

Figure 25:
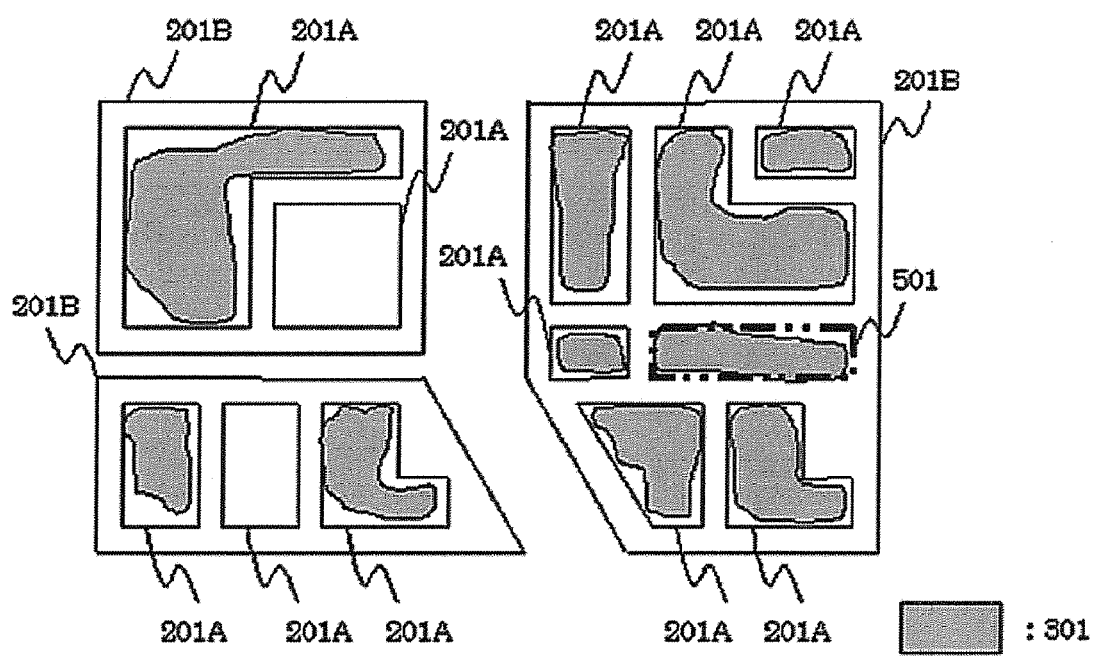
FIG. 25 is a schematic view showing an example of new building determination results.

FIG. 25 is a further schematic view showing an example of new building detection results. In FIG. 25, a new building on the map 501 is depicted using a double-dashed line on the map data and extracted feature height data shown in FIG. 23. It is therefore possible to carry out a new building determination with a high degree of precision by determining that regions for trees and vehicles etc. are small outer building elevation regions and not new buildings as a result of using the new building threshold value.

FIG. 22 is a schematic diagram showing an example of actual map change detection results. FIG. 22 depicts output results for the change detection device 100 and represents building serial numbers, type of change, and information for latitude and longitude on the map. In FIG. 22, the latitude and longitude are used as position information for the buildings but any method of representation capable correlating a position with the real world such as, for example, a plane rectangular coordinate system where a position is projected in a plane can be used. Further, the output is shown as the detection results in FIG. 22 but the output method is by no means limited and can be any method of representation capable of correlating the positions of the content of change and the real world.

Other aspects and preferred modifications of the present invention are included in the following.

With a map change detection device of a first aspect of the present invention, the change detector preferably extracts an elevation region that is a set of points, of the feature height data, having a height greater than or equal to the predetermined value, compares the elevation region and the map data, and detects changes in a feature constituting the target.

The change detector also preferably detects change in a feature that is the target when the feature height data is a plus quantity at a point where a feature that is a target does not exist in the map data, or when the feature height data is a predetermined value or less at a point where a feature that is a target exists in the map data.

The change detector also preferably detects change in a feature that is the target when a one portion set of the elevation region exceeds a predetermined density and exceeds a predetermined area at a region where a feature that is a target does not exist in the map data.

The change detector also preferably detects change of the feature when the elevation region is a predetermined area or less within an arbitrary feature of the map data.

With a map change detection method of a second aspect of the present invention, change detection extracts an elevation region that is a set of points, of the feature height data, having a height greater than or equal to the predetermined value, compares the elevation region and the map data, and detects changes in a feature constituting the target.

The change detection also preferably detects change in a feature that is the target when the feature height data is a plus quantity at a point where a feature that is a target does not exist in the map data, or when the feature height data is a predetermined value or less at a point where a feature that is a target exists in the map data.

The change detection also preferably detects change in a feature that is the target when a one portion set of the elevation region exceeds a predetermined density and exceeds a predetermined area at a region where a feature that is a target does not exist in the map data.

The change detection also preferably detects change of the feature when the elevation region is a predetermined area or less within an arbitrary feature of the map data.

The following effects are obtained by the present invention.

Firstly, as a result of providing the feature height extractor, it is possible to compare DSM data and map data. It is then possible to determine demolition with few detection omissions by detecting changes taking into consideration the height of buildings.

Secondly, as a result of comparing DSM data obtained by stereo matching processing and map data, it is possible to detect newly built regions that could not be detected by conventional methods such as image matching.

Thirdly, it is possible to acquire map change detection results automatically after the user inputs data and determination rules. It is therefore possible to dramatically reduce costs compared to detection by visual observation.

Fourthly, detection is possible while accurately specifying locations of features as a result of comparing feature height data and a map. Detection omissions that occur for detection by visual observation can therefore be prevented.

Fifthly, it is possible to estimate the height of buildings by calculating the average height of elevation regions for each building on a map. It is therefore possible to detect extension and reconstruction of buildings by comparing height data when map change detection is carried out again based on an updated map.

The present invention is therefore capable of solving a problem where changes in a map are sometimes not detected and a problem where the construction of new buildings cannot be detected while detecting changes of targets while keeping down costs.

The present invention is described giving a preferred embodiment and applied examples but the present invention is by no means limited to the above embodiment and applied examples, and various modifications are possible within range of this technological concept. For example, a description is given of the case of features in the above embodiment but the target is by no means limited to features, provided that the target is included in a predetermined region depicted on a map.

The above hardware configuration and flowcharts are merely provided as examples, and can be arbitrarily modified and amended.

The portions centering on carrying out processing of the change detection device 100 including the CPU 201, main storage unit 202, presentation unit 203, input unit 204, interface 205, auxiliary storage unit 206, and system bus 207 etc. do not have to be a dedicated system and can also be implemented using a normal computer system. For example, the change detection device 100 executing the aforementioned processing can also be implemented by storing and distributing a computer program for executing the above operations on a computer-readable recording medium (a flexible disc, a CD-ROM, a DVD-ROM etc.) and then installing the computer program on a computer. Moreover, the change detection device 100 can also be configured by storing the computer program in advance on a storage device having a server device that is on a communication network such as the Internet. The computer program can then be downloaded etc. to a normal computer system.

The functions of the change detection device 100 can also be shared between an OS (operating system) and an application program. It is also possible for just the application program to be stored on a recording medium or a storage device in the event of implementation using an OS and an application program in cooperation.

Moreover, it is possible to superimpose the computer program with a carrier wave for distribution via a communication network. For example, the computer program can be presented on a presentation board (BSS, Bulletin Board System) on a communication network, with the computer program then being distributed via the network. A configuration can also be adopted where the computer program is started up and the above processing is executed in the same manner as the execution of other application programs under the control of the OS.

This application claims priority based on Japanese Patent Application No. 2007-145971 filed on May 31, 2007, the entire disclosure of which is incorporated herein by reference in its entirety.

According to the map change detection device of the present invention, it is possible to automatically detect change in a target on a map from DSM data obtained from an image at high speed and detection of change can be achieved at low cost with few omissions.

What is claimed is:

1. A map change detection device that detects changes in features that are targets described on a map, the map change detection device comprising:
   a stereo matching processor that, inputted with a plurality of images taken of predetermined regions from a plurality of different positions, extracts digital surface model data representing surfaces of the predetermined regions in three-dimensional coordinates;
   a feature height extractor that extracts feature heights where an elevation from ground level is subtracted from the digital surface model data extracted by the stereo matching processor; and
   a change detector that detects changes in a feature that is the target by comparing feature height data extracted by the feature height extractor and map data.

2. The map change detection device according to claim 1, wherein the change detector extracts an elevation region that is a set of points, of the feature height data, having a height greater than or equal to a predetermined value, compares the elevation region and the map data, and detects changes in a feature that is the target.

3. The map change detection device according to claim 1, wherein the change detector detects changes in a feature that is the target when:
   the feature height data is a plus quantity at a point where the feature that is the target does not exist in the map data; or the feature height data is a predetermined value or less at a point where the feature that is the target exists in the map data.

4. The map change detection device according to claim 2, wherein the change detector detects changes in a feature that is the target when:
   the feature height data is a plus quantity at a point where the feature that is the target does not exist in the map data; or
   the feature height data is a predetermined value or less at a point where the feature that is the target exists in the map data.

5. The map change detection device according to claim 2, wherein the change detector detects change in a feature that is the target when a one portion set of the elevation region exceeds a predetermined density and exceeds a predetermined area at a region where a feature that is the target does not exist in the map data.

6. The map change detection device according to claim 2, wherein the change detector detects changes of the feature when the elevation region is a predetermined area or less within an arbitrary feature of the map data.

7. A map change detection method performed by a map change detection device, for detecting changes in features that are targets included in a predetermined region on a map, comprising:
   stereo matching processing by a stereo matching processor of the map change detection device where a plurality of images taken of predetermined regions from a plurality of different positions are inputted and digital surface model data representing surfaces of the predetermined regions in three-dimensional coordinates is extracted;
   feature height extraction by a feature height extractor of the map change detection device where feature heights where an elevation from ground level is subtracted, are extracted from the digital surface model data extracted by the stereo matching processing; and
   change detection by a change detector of the map change detection device where changes in a feature that is the target by comparing feature height data extracted in the feature height extraction and map data are detected.

8. The map change detection method according to claim 7, wherein an elevation region that is a set of points, of the feature height data, having a height greater than or equal to a predetermined value is extracted, the elevation region and the map data are compared, and changes in a feature that is the target are detected by the change detector during the change detection.

9. The map change detection method according to claim 7, wherein changes in a feature that is the target are detected by the change detector during the change detection when:
   the feature height data is a plus quantity at a point where the feature that is the target does not exist in the map data; or
   the feature height data is a predetermined value or less at a point where the feature that is the target exists in the map data.

10. The map change detection method according to claim 8, wherein changes in a feature that is the target are detected by the change detector during the change detection when:
    the feature height data is a plus quantity at a point where the feature that is the target does not exist in the map data; or
    the feature height data is a predetermined value or less at a point where the feature that is the target exists in the map data.

11. The map change detection method according to claim 8, wherein changes in a feature that is the target are detected by the change detector during the change detection when a one portion set of the elevation region exceeds a predetermined density and exceeds a predetermined area at a region where a feature that is the target does not exist in the map data.

12. The map change detection method according to claim 8, wherein changes of the feature are detected by the change detector during change the change detection when the elevation region is a predetermined area or less within an arbitrary feature of the map data.

13. A non-transitory, tangible computer-readable medium that stores a program for implementing, on a computer:
    a stereo matching processor inputted with a plurality of images taken of predetermined regions from a plurality of different positions, that extracts digital surface model data representing surfaces of the predetermined regions in three-dimensional coordinates;
    a feature height extractor that extracts feature heights where an elevation from ground level is subtracted, from the digital surface model data extracted by the stereo matching processor; and
    a change detector that detects change in a feature that is the target described on a map by comparing feature height data extracted by the feature height extractor and map data.

* * * * *